United States Patent [19]

Wang et al.

[11] Patent Number: 5,204,830
[45] Date of Patent: Apr. 20, 1993

[54] FAST PIPELINED MATRIX MULTIPLIER

[75] Inventors: Jinn-Shyan Wang, Hsin Chu; Jinn-Nan Kao, Taipei, both of Taiwan

[73] Assignee: Industrial Technology Research Institute, Hsinchu, Taiwan

[21] Appl. No.: 836,075

[22] Filed: Feb. 13, 1992

[51] Int. Cl.⁵ .................................................. G06F 7/52
[52] U.S. Cl. ...................................................... 364/754
[58] Field of Search ................ 364/754, 736, 725, 726

[56] References Cited

U.S. PATENT DOCUMENTS

| | | | |
|---|---|---|---|
| 4,150,434 | 4/1979 | Shibayama et al. | 364/736 X |
| 4,553,220 | 11/1985 | Swanson | 364/715.04 |
| 4,601,006 | 7/1986 | Liu | 364/726 |
| 4,787,057 | 11/1988 | Hammond | 364/754 |
| 4,841,469 | 6/1989 | Kuenemund et al. | 364/754 |
| 4,937,776 | 6/1990 | Myers et al. | 364/736 |
| 5,038,312 | 8/1991 | Kojima | 364/736 |

OTHER PUBLICATIONS

Sun et al., "VLSI Implementation of 16×16 Discrete Cosine Transform", *IEEE Trans. on Cir. & Sys.*, Apr., 1989, 610–617.

Ahmed et al., "Discrete Cosine Transform", 1974 IEEE Trans. on Comp., 90–93.

Hou, "A Fast Recursive Algorithm for Computing the Discrete Cosine Transform", *IEEE Trans. on Cir. and Sys.*, Oct., 1987, 1455–1461.

Cho et al., "Fast Algorithm and Implementation of a 2-D Discrete Cosine Transform," *IEEE Trans. on Cir. & Sysm.*, Mar., 1991, 297–305.

Primary Examiner—Tan V. Mai
Attorney, Agent, or Firm—Marmorek, Guttman & Rubenstein

[57] ABSTRACT

A circuit and algorithm for multiplying three matrices is disclosed having a first multiplication stage for multiplying a first matrix with a second matrix to produce an intermediate product matrix. Additionally, the circuit and algorithm have a second stage for multiplying a third matrix with the intermediate product matrix to compute the final product matrix. Each stage is provided with a plurality of bit processing element pipelines for generating the elements of the product matrix of that stage. In each stage, one pipeline is provided for generating each column of the product matrix and each pipeline within a stage operates in parallel with the other pipelines of that stage.

16 Claims, 14 Drawing Sheets

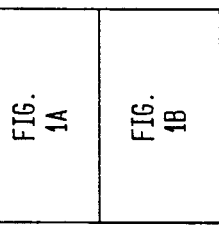
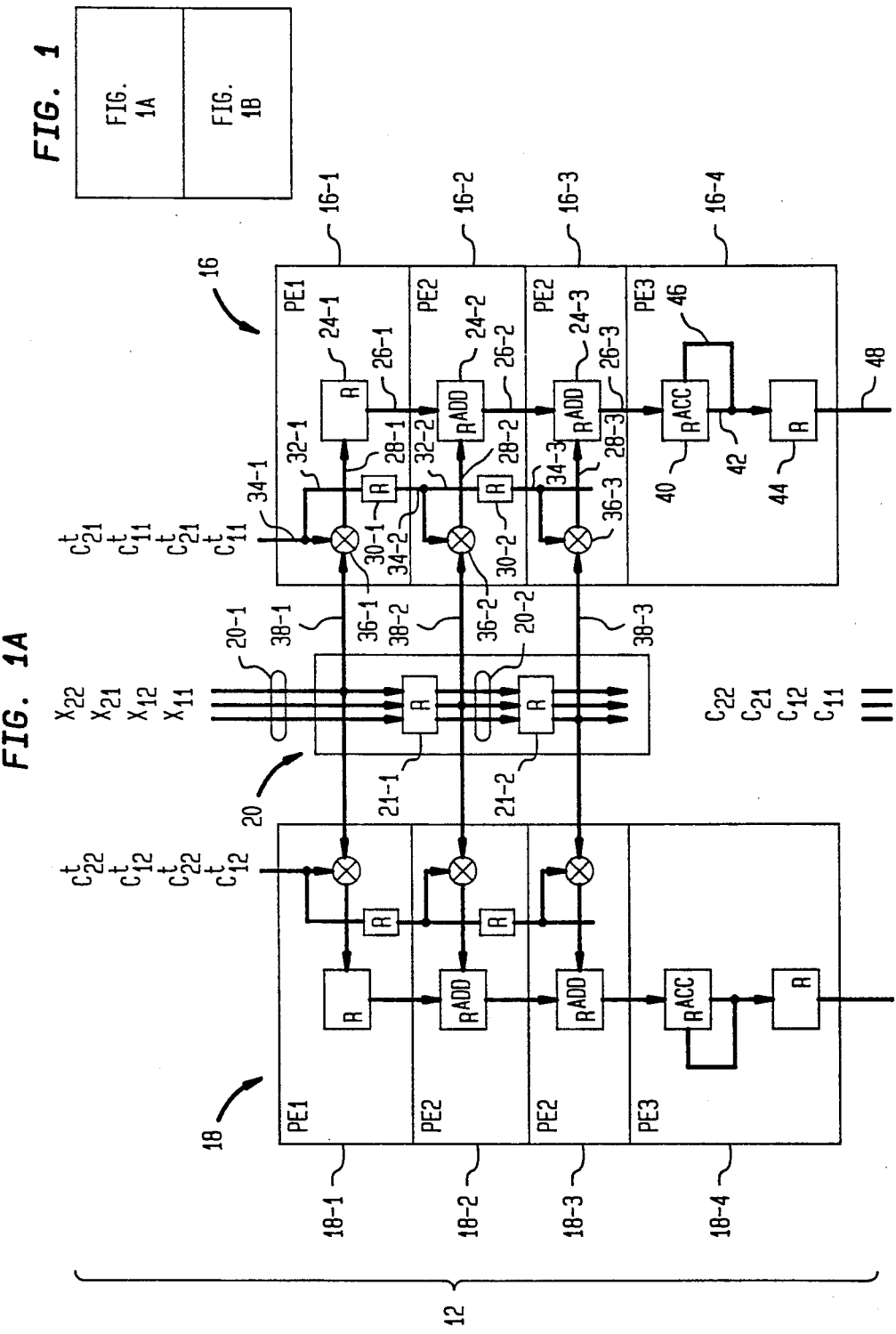

PE1 UNIT

PE3 UNIT

PE2 UNIT

SWITCHING MATRIX

S-BOX CONTROL TIMING WAVEFORM

2ND MULTIPLIER STAGE

1ST MULTIPLIER STAGE

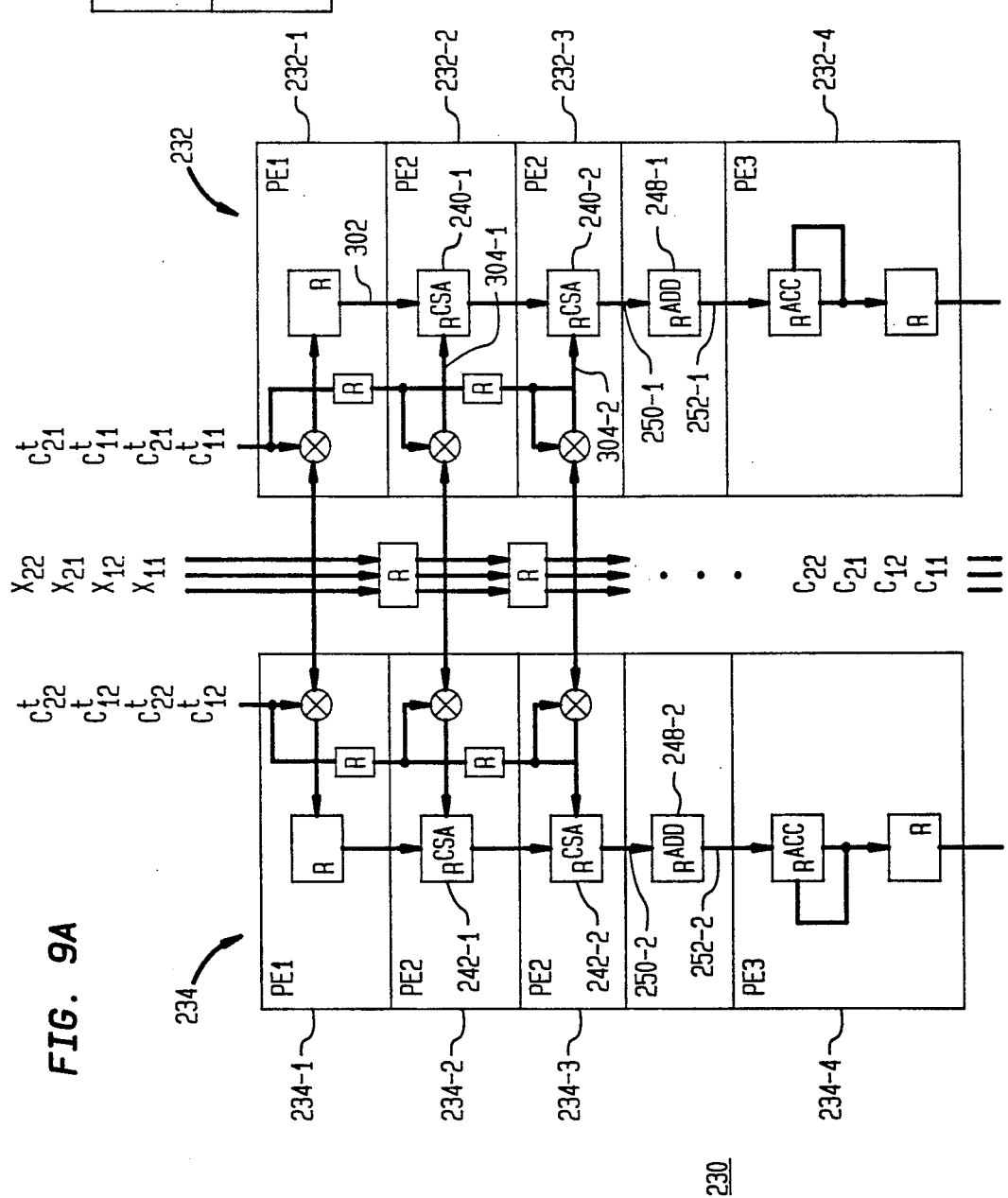

FAST PIPELINED MATRIX MULTIPLIER

FIELD OF THE INVENTION

The present invention relates to an algorithm and circuit for multiplying matrices. The inventive algorithm and circuit is especially useful for obtaining the discrete cosine transform of a data matrix.

BACKGROUND OF THE INVENTION

The discrete cosine transform (DCT) in two dimensions is important for compressing video signals for storage and for transmission to a remote location.

A two-dimensional discrete cosine transform from an NxN input data matrix can be defined as $$Z(k_1, k_2) = \frac{4C(k_1)C(k_2)}{N^2} \sum_{n_1=0}^{N} \sum_{n_2=0}^{N} X(n_1, n_2) \cos \frac{(2n_1 + 1)k_1\pi}{2N} \cos \frac{(2n_2 + 1)k_2\pi}{2N} \quad (1a)$$

Its inversion can be similarly defined as $$X(n_1, n_2) = \sum_{k_1=0}^{N-1} \sum_{k_2=0}^{N-1} C(k_1)C(k_2)Z(k_1, k_2) \cos \frac{(2n_1 + 1)k_1\pi}{2N} \cos \frac{(2n_2 + 1)k_2\pi}{2N} \quad (1b)$$

where $$C(k) = \begin{cases} \frac{1}{\sqrt{2}}, & \text{for } k = 0 \\ 1, & \text{for } k \neq 0 \end{cases}$$

$X(n_1, n_2)$ data matrix and $Z(k_1, k_2)$ is the matrix of transform coefficients.

Equation (1a) can be written in matrix form $$Z = CXC^t \quad (2)$$

where C stands for the cosine coefficients matrix and $c^t$ stands for the transpose of C.

In a more detailed version, equation (2) can be rewritten as $$\begin{bmatrix} Z_{11} & Z_{12} & \cdots & Z_{1N} \\ Z_{21} & Z_{22} & \cdots & Z_{2N} \\ \vdots & & & \\ Z_{N1} & Z_{N2} & \cdots & Z_{NN} \end{bmatrix} = \begin{bmatrix} C_{11} & C_{12} & \cdots & C_{1N} \\ C_{21} & C_{22} & \cdots & C_{2N} \\ \vdots & & & \\ C_{N1} & C_{N2} & \cdots & C_{NN} \end{bmatrix} \begin{bmatrix} X_{11} & X_{12} & \cdots & X_{1N} \\ X_{21} & X_{22} & \cdots & X_{2N} \\ \vdots & & & \\ X_{N1} & X_{N2} & \cdots & X_{NN} \end{bmatrix} \begin{bmatrix} C^t_{11} & C^t_{12} & \cdots & C^t_{1N} \\ C^t_{21} & C^t_{22} & \cdots & C^t_{2N} \\ \vdots & & & \\ C^t_{N1} & C^t_{N2} & \cdots & C^t_{NN} \end{bmatrix} \quad (3)$$

where $C^t_{ij} \triangleq C_{ji}$

There are three NxN matrices multiplying with each other. We can thus define a matrix $Y = XC^t$ or $$\begin{bmatrix} Y_{11} & Y_{12} & \cdots & Y_{1N} \\ Y_{21} & Y_{22} & \cdots & Y_{2N} \\ \vdots & & & \\ Y_{N1} & Y_{N2} & \cdots & Y_{NN} \end{bmatrix} = \begin{bmatrix} X_{11} & X_{12} & \cdots & X_{1N} \\ X_{21} & X_{22} & \cdots & X_{2N} \\ \vdots & & & \\ X_{N1} & X_{N2} & \cdots & X_{NN} \end{bmatrix} \begin{bmatrix} C^t_{11} & C^t_{12} & \cdots & C^t_{1N} \\ C^t_{21} & C^t_{22} & \cdots & C^t_{2N} \\ \vdots & & & \\ C^t_{N1} & C^t_{N2} & \cdots & C^t_{NN} \end{bmatrix} \quad (4)$$

the matrix Z can be written as $$\begin{bmatrix} Z_{11} & Z_{12} & \cdots & Z_{1N} \\ Z_{21} & Z_{22} & \cdots & Z_{2N} \\ \vdots & & & \\ Z_{N1} & Z_{N2} & \cdots & Z_{NN} \end{bmatrix} = \begin{bmatrix} C_{11} & C_{12} & \cdots & C_{1N} \\ C_{21} & C_{22} & \cdots & C_{2N} \\ \vdots & & & \\ C_{N1} & C_{N2} & \cdots & C_{NN} \end{bmatrix} \begin{bmatrix} Y_{11} & Y_{12} & \cdots & Y_{1N} \\ Y_{21} & Y_{22} & \cdots & Y_{2N} \\ \vdots & & & \\ Y_{N1} & Y_{N2} & \cdots & Y_{NN} \end{bmatrix} \quad (5)$$

In a two-by-two example, the equation (4) reduces itself to $$\begin{bmatrix} Y_{11} & Y_{12} \\ Y_{21} & Y_{22} \end{bmatrix} = \begin{bmatrix} X_{11} & X_{12} \\ X_{21} & X_{22} \end{bmatrix} \begin{bmatrix} C^t_{11} & C^t_{12} \\ C^t_{21} & C^t_{22} \end{bmatrix} \quad (6)$$

and equation (5) reduces itself to $$\begin{bmatrix} z_{11} & z_{12} \\ z_{21} & z_{22} \end{bmatrix} = \begin{bmatrix} c_{11} & c_{12} \\ c_{21} & c_{22} \end{bmatrix} \begin{bmatrix} r'_{11} & r'_{12} \\ r'_{21} & r'_{22} \end{bmatrix} \quad (7)$$

In the prior art there have been numerous proposals for implementing the DCT (see, e.g., N. Ahmed, T. Natarajan and K. Rao, *Discrete Cosine Transform* 1974 IEEE Trans. on Comp. 90; M. Sun, T. Chen and A. Gottlieb, *VLSI Implementation of 16×16 Discrete Cosine Transform*, IEEE Trans. on Cir. and Sys., Apr., 1989, 610; N. Chou and S. Lee, *Fast Algorithm and Implementation of a 2-D Discrete Cosine Transform*, IEEE Trans. on Cir. and Sys., Mar., 1991, 297; H. Hou, *A Fast Recursive Algorithm for Computing the Discrete Cosine Transform*, IEEE Trans. on Cir. and Sys., Oct., 1987, 1455).

These prior art techniques have the following weaknesses.

1. If row-column decomposition is used, a transposed memory is required which renders a solution with heavily pipe-lined data flow impossible.

2. If a direct implementation of a two-dimensional DCT is used, the cost of the hardware necessary for such an implementation exceeds its benefit.

3. Most solutions lack modularization and hence yield implementations which are both time-consuming and inefficient.

It is one aspect of the present invention to provide a circuit and algorithm for obtaining a DCT which overcomes the weaknesses of the prior art.

As can be seen above, to carry out a DCT the multiplication of three matrices is necessary. Therefore it is also an object of the invention to provide a circuit and algorithm which efficiently multiply three matrices, wherein one application of the circuit is to multiply the three matrices required for a DCT.

SUMMARY OF THE INVENTION

A matrix multiplier circuit and algorithm is disclosed having a first multiplication stage for multiplying a first matrix X comprised of the elements $x_{ij}$ i=1. , , , ,I,j=1, ... J and a second matrix $C^t$ comprised of the elements $c^t_{jk}$, k=1, ... ,K. Illustratively, X is a data matrix and $C^t$ is the transpose of a matrix of cosine coefficients, but this is only illustrative.

The first stage comprises a plurality of processing element pipelines and one register pipeline. Each processing element pipeline illustratively comprises a series of bit multiplication processing elements. A first sequence of inputs, comprising the matrix elements $x_{ij}$ of X, in the order $x_{11}, x_{12}, \ldots x_{1J}, x_{21}, x_{22}, \ldots, x_{2J}, \ldots, x_{IJ}$ is fed into the register pipeline. Therein, the matrix elements are shifted from register to register. The register pipeline outputs, in consecutive cycles, an $m^{th}$ bit of each matrix element in the first sequence to the corresponding $m^{th}$ bit multiplication element of each processor pipeline, where m is an index from one to the number of bits in the elements $x_{ij}$. As a second input sequence, each processing pipeline also separately receives I repetitions of the elements of one particular column (i.e. column k) of $C^t$ where I equals the number of rows in the X matrix. In other words, each processing column receives the elements of one column of $C^t$, repeated once for each row in the X matrix. These matrix elements are passed from processing element to processing element along a processing pipeline. The matrix elements are input, one element from each sequence per cycle. Each processing element pipeline sequentially calculates the products $x_{ij}c_{jk}$ for a particular value of k. Thus, the number of processing element pipelines is equal to K and there is one processing element pipeline for each value of the index k, i.e. one processing element pipeline for each column of elements in $C^t$.

At the end of each processing element pipeline of the first stage is a processing element which has an accumulator for accumulating every J products $x_{ij}c_{jk}$ output from the next to last processing element within that pipeline. Such an accumulation scheme yields the elements of the intermediate matrix Y. In this fashion, the accumulators of the last processing element of each pipeline add together the products produced from each group of argument pairs of the elements of one row of X and one column of $C^t$.

The matrix multiplier circuit also has a second stage for multiplying a third matrix C comprised of the elements $c_{li}$, l=1, ... , L by the intermediate matrix Y comprised of the elements $y_{ik}$. Illustratively, C is a matrix of cosine coefficients but this is only illustrative.

The second stage also comprises a plurality of processing element pipelines, each comprising a series of bit multiplication processing elements, and one register pipeline. A first sequence, comprising the matrix elements $c_{li}$ of c in the order $c_{11}, c_{21}, \ldots, c_{L1}, c_{12}, c_{22}, \ldots, c_{L2}, \ldots c_{LI}$ is input to the register pipeline. The register pipeline shifts the input elements from register to register. The register pipeline outputs in consecutive cycles a $p^{th}$ bit of each matrix element of the input sequence to the $p^{th}$ bit multiplication processing element of each processing pipeline, where P is an index from one to the number of bits in the elements $c_{li}$. A second sequence, input separately to the processing element pipelines, comprises L repetitions of each element $y_{ik}$ of a particular column k of the matrix Y where L equals the number of rows in the matrix C. In other words, each processing element pipeline of the second stage receives each element of one column k of Y repeated once, for every row of the C matrix. Again, the elements are inputted, one element from each sequence per clock.

Each processing element pipeline sequentially computes the products $c_{li}y_{ik}$ for a particular value of k. Again, the number of processing element pipelines is equal to K and there is one processing element pipeline for each value of the index k.

At the output of each processing element pipeline of the second stage is a switching array and second accumulator for selectively accumulating the products $c_{li}y_{ik}$ so that the second accumulator outputs the elements of the product matrix Z. The second accumulator selectively accumulates the products so that the following is satisfied:

$$z_{lk} = \sum_{i=1}^{I} c_{li}y_{ik}$$

BRIEF DESCRIPTION OF THE DRAWINGS

FIG. 1 depicts the relationship of FIGS. 1A and 1B.

FIG. 1A depicts the top half of a matrix multiplier circuit according to the present invention.

FIG. 9 depicts the relationship of FIGS. 9A and 9B.

FIG. 9A depicts the top half of an alternative embodiment of the present invention with a carry save adder.

DETAILED DESCRIPTION OF THE PREFERRED EMBODIMENT

Figure 1B:
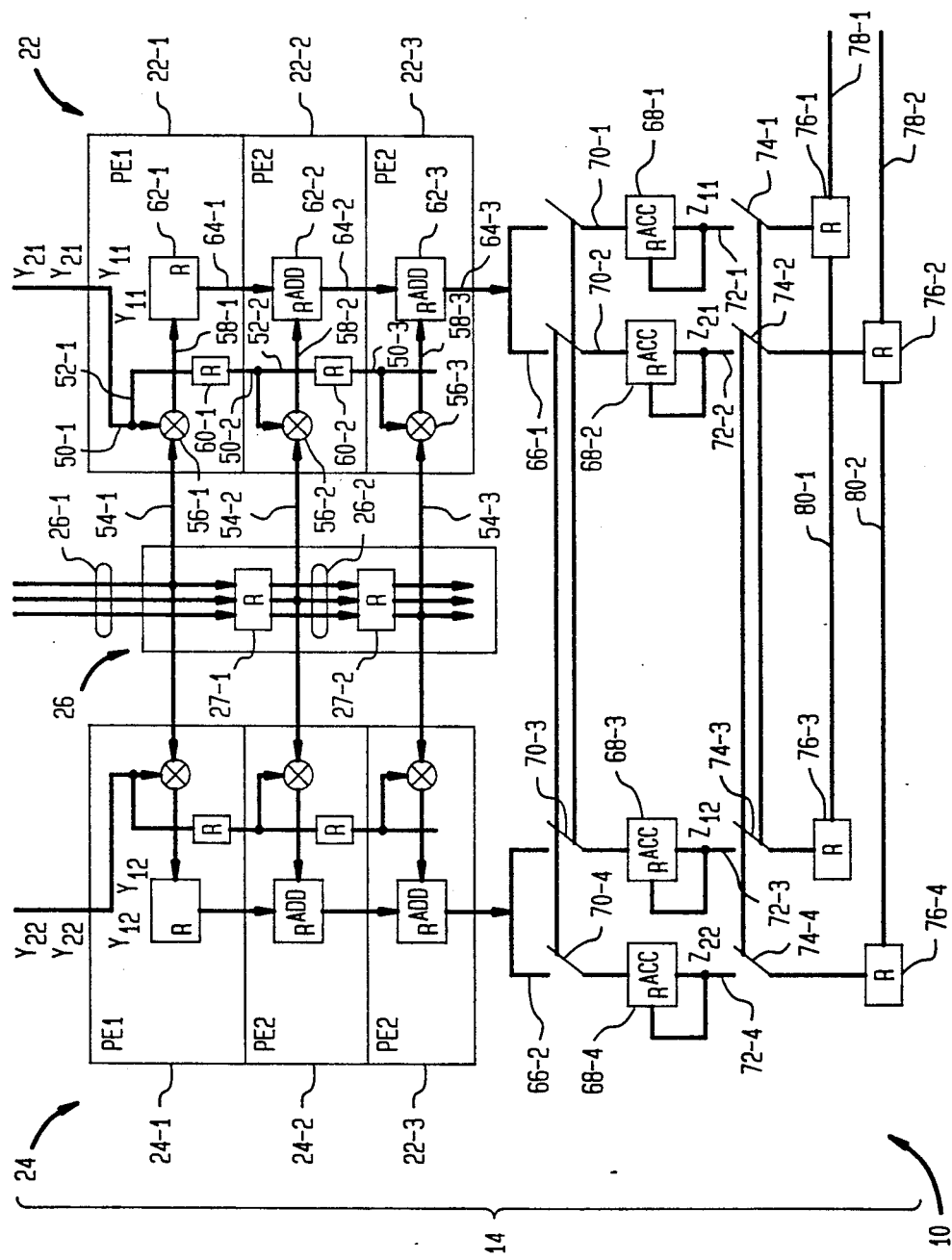
FIG. 1B depicts the bottom half of a matrix multiplier circuit according to the present invention.

Referring now to FIG. 1, a matrix multiplier circuit 10 is shown capable of supporting a 2×2 DCT. The matrix multiplier 10 has two stages 12 and 14. A DCT may be carried out by the multiplication $Z=CXC^t$ where C is a matrix of transform coefficients, $C^t$ is the transpose of C and X is a data matrix. The first stage 12 performs the multiplication $XC^t$ to generate an intermediate matrix Y. The second stage performs the multiplication CY to generate Z. The first stage 12 has a column of registers 20 and two columns of processing elements 16 and 18. The two processing element columns 16, 18 are identical.

Each processing element column 16,18 consists of a PE1 unit 16-1, 18-1 connected to a plurality (e.g., two) of PE2 units 16-2, 16-3 and 18-2, 18-3. One PE1 or PE2 unit is needed for each bit of the data elements fed into the register column 20. The total number of PE1 and PE2 units per column is therefore equal to the number of bits of the data elements input to the register column 20. Although the circuit of FIG. 1 shows each column 16,18 with only two PE2 units the circuit 10 may be adapted to accommodate any number of PE2 units. Connected to the last PE2 unit of the columns 16,18 is a pE3 unit 16-4, 18-4. The first column 16 multiplies the elements of the matrix X by the elements of the first column of the matrix $C^t$. The second column 18 multiplies the elements of the matrix X by the elements of the second column of the matrix $C^t$.

The operation of one processor element column 16 will be described in conjunction with the register column 20. It may be appreciated that since the second processor column 18 is identical to the first column 16 that the discussion holds for both columns. The 2×2 matrix X, having the elements $x_{11}$, $x_{12}$, $x_{21}$, $x_{22}$ is inputted, one element at a time, on lines 20-1 to the register column 20. Simultaneously, one column of the matrix $C^t$, comprised of the elements $c^t_{11}$, $c^t_{21}$, is inputted on line 34-1 to the first processing element PE1 16-1 of the first column 16 (one element at a time). It may be appreciated that the first column of $C^t$ must be repeated for every row of X in a matrix multiplication. As such, the first column of $C^t$ is inputted twice on line 34-1.

The first input on the lines 20-1 is $x_{11}$ from the data matrix X. The first input on lines 34-1 is the element $c^t_{11}$ from the matrix $C^t$. It is explained below how the column 16 forms the product $x_{11}c^t_{11}$. The processing of $c^t_{11}$ in PE1 16-1 is as follows. A tap line 38-1, connected to the first bit of the input lines 20-1 feeds the first bit of the element $x_{11}$ to the PE1 unit of column 16. Therein, line 38-1 feeds the first bit to the selector control input of a multiplexer 36-1. This multiplexer 36-1 also receives the element $c^t_{11}$ on line 34-1 as a data input. If the first bit is set, i.e. equal to a logic one, the element $c^t_{11}$ inputted on line 34-1 is selected. If the first bit is clear, i.e. equal to a logic zero then a logic zero is selected. The output of the multiplexer is fed via line 28-1 to a register 24-1 where it can be stored by the falling edge of the clock. This value constitutes a partial product of the first input elements $x_{11}$ and $c^t_{11}$. The first input element of the first column of $c^t$, $c^t_{11}$, is fed via line 32-1 to a register 30-1 within the PE1 unit of column 16 where it is stored. The processing of $x_{11}$ and $c^t_{11}$ by PE 16-1 is complete.

Additionally, by the falling edge of the clock, the first input element of X, $x_{11}$ is fed via lines 20-1 to the first register 21-1 of the register column 20 where it is stored. On the next clock, the second bit of the quantity $x_{11}$ and $c^t_{11}$ are processed by PE2 16-2. Meanwhile the next pair of inputs $c^t_{21}$ and $x_{12}$ are processed by the PE1 unit 16-1 and register column 20.

The processing of the elements $x_{11}$ and $c^t_{11}$ in PE2 is now discussed. A tap line 38-2 feeds the second bit of $x_{11}$ to the selector control input of the multiplexer 36-2 of the PE2 unit 16-2. Meanwhile, the first column element $c^t_{11}$ is fed via line 34-2 to a data input of the multiplexer 36-2 of the PE2 unit 16-2. If the second bit of $x_{11}$ (fed via line 38-2) is set, $c^t_{11}$ is selected. by the multiplexer 36-2. If the second bit is clear, a logic zero is selected. The output of the multiplexer 36-2 is fed via line 28-2 to an addition register 24-2 which also receives the partial product stored in the register 24-1 of the pE1 unit 16-1 via line 26-1. Therein, these two values are added and stored to compute a new partial product. The data of the multiplexer 36-2 of this PE2 unit 16-2, however, represents a multiplication by the second bit of the data $x_{11}$. Hence, the multiplexer 36-2 output must first be shifted left one bit with respect to the partial product of register 24-1 prior to adding the two numbers together. By the falling edge of the second clock, a new partial product is stored in the addition register 24-2. Also, $x_{11}$, is input to the register 21-2 via lines 20-2 of the register column 20 and stored therein. Similarly, the element $c^t_{11}$ is input via line 32-2 to a register 30-2 in the PE2 unit 16-2 where it is stored. It may also be appreciated that the second input argument pair ($x_{12}$, $c^t_{11}$) and their first partial product are respectively stored in the registers 21-1 of register column 20 and the registers 30-1 and 24-1.

On the next clock, a third argument pair ($x_{21}$, $c^t_{11}$) may be input, respectively on lines 20-1 and 34-1 for processing by the PE1 unit 16-1 and register column 20. Data flow of the second argument pair ($x_{12}$, $c^t_{21}$) continues in the PE2 unit 16-2 and register column 20 as discussed above for the first argument pair ($x_{11}$, $c^t_{11}$). Data processing of the first argument pair continues in the next PE2 unit 16-3 and the register column 20. A tap line 38-3 feeds the third bit of the input $x_{11}$ to the selector control input of a multiplexer 36-3 of a PE2 unit 16-3 of a third level. Also received by this multiplexer 36-3 as a data input is the element $c^t_{11}$ via line 34-3. If the third bit of $x_{11}$ is set, the column input $c^t_{11}$ is selected for output; if the third bit is clear, a logic zero is selected. The output is fed via line 28-3 to an addition register 24-3 where it is shifted left two bits and added to the partial product fed from the addition register 24-2 via line 26-2. This result is stored therein by the falling edge of clock three.

It may be appreciated that for elements of the matrix X having more than three bits, additional PE2 units may be connected below the PE2 unit 16-3 in a fashion similar to that described above. Similarly, for each added PE2 unit a register may be added to the register column 20, again, as hereinbefore described. In such a case, the operation of a PE2 unit on an $m^{th}$ level, where m is an index between 2 and the number of bits in the inputted X matrix element, is easily described. An $m^{th}$ bit of the X matrix element (from the $m-1^{th}$ register of the register column 20) is fed to the multiplexer of the PE2 unit of the $m^{th}$ level as a selection control input. If the bit is set, the corresponding $c^t$ input (retrieved from a register of the PE2 unit of the $m-1^{th}$ level) is selected. If the bit is clear a logic zero is selected. The output of this multiplexer is fed to an addition register where it is shifted to the left m.1 bits and added to the partial product of the $m-1^{th}$ level to form a new partial product.

Continuing with the operation of the processing element column 16, the final product of the first product pair ($x_{11}$, $c^t_{11}$) may be output from the addition register 24-3 on the fourth clock. Recalling general matrix math, the sum of the products produced by multiplying the elements of one row of a first matrix X with the elements of one column of a second matrix $C^t$ produces one element of the intermediate matrix $Y=XC^t$. For instance, $y_{11}=x_{11}c^1_{11}+x_{12}c^t_{21}$ and $y_{21}=x_{21}c^t_{11}+x_{22}c^t_{21}$. An examination of the sequence of the input argument pairs reveals that the first and second products by the PE2 unit 16-3, i.e., $x_{11}c^t_{11}$, $x_{12}c^t_{21}$ may be added to produce $y_{11}$ and the third and fourth products may be added to produce $y_{21}$. To that end, a PE3 unit 16-4 may be provided at the bottom of the processing element column 16.

On clock four, the product $x_{11}c^t_{11}$ is fed via line 26-3 to an accumulator 40. The accumulator has a feed back path 46 so that on clock five, the first product $x_{11}c^t_{11}$ may be re-input to the accumulator 40. On clock five, the accumulator 40 receives as a second input the second product $x_{12}c^t_{21}$ via line 26-3. This is because the second product, which has lagged the first product by one computation level has caught up. These two products are added and stored in the accumulator 40 by the falling edge of clock five.

On clock six, the third product, $x_{21}c^t_{11}$, is inputted via line 26-3 to the accumulator 40. At this point it is desireable to remove the contents of the accumulator (now $y_{11}$). Thus $y_{11}$ is outputted from the accumulator 40 on line 42 to a register 44. From register 44, the element $y_{11}$ may be outputted for up to two clocks at which point the element $y_{21}$ is computed and input to the register 44.

Thus, the processing element column 16 is capable of producing the elements $y_{11}$ and $y_{21}$ which comprise the first column of Y. By a similar process, the processing element column 18 may receive, sequentially, the elements of a second column of the matrix $C^t$ and produce the elements of a second column of Y, $y_{12}$ and $y_{22}$. It may be appreciated that these columns of processing elements 16, 18 may run concurrently. Further, to perform a complete parallel computation of each column of Y the matrix multiplier circuit 10 must have one processing element column per column of Y. The circuit 10 of FIG. 1 satisfies this requirement for an intermediate matrix Y having two columns. Illustratively, such a circuit, therefore may be used to compute a $2 \times 2$ DCT.

The second stage 14 also has two columns of processing elements 22, 24 and a register column 26. As with columns 16 and 18, columns 22 and 24 are identical to each other. The column 22 comprises a PE1 unit 22-1 followed by two PE2 units 22-2 and 22-3. Similarly, the column 24 comprises a PE1 unit 24-1 and two PE2 units 24-2 and 24-3. Hence, a discussion of column 22 would hold equally for column 24. The register column 26 illustratively receives the elements of the third matrix C on lines 26-1 in the following order: $c_{11}$, $c_{21}$, $c_{12}$, $c_{22}$. Column 22 illustratively repetitively receives the elements of the first column of Y on line 50-1 in the following order: $y_{11}$, $y_{11}$, $y_{21}$, $y_{21}$.

The operation of one column 22 in conjunction with the register column 26 is now discussed. Continuing where the discussion of column 16 left off, on clock six, the value $y_{11}$ may be output from the register 44 via line 48. This line 48, is connected to the input line 50-1 of the PE1 unit 22-1 of the column 22. The PE1 unit 22-1 is identical to the PE1 unit 16-1 of column 16. Thus, $y_{11}$ is applied as a data input to a multiplexer 56-1 via line 50-1. The register column 26 is also identical to the register column 20 of the first stage 12. Thus, the first element, $c_{11}$, of a third matrix C may be simultaneously input via lines 26-1 to a first register 27-1. A tap line 54-1 feeds the first bit of the first element $c_{11}$ to the selector control input of a multiplexer 56-1. If the first bit is set the element $y_{11}$ is selected. If the first bit is clear a logic zero is selected. The multiplexer output is fed via line 58-1 to a register 62-1 where it is stored. Additionally, $y_{11}$ is fed via line 52-1 to a register 60-1 where it is stored. The processing of the first bit of ˚ n and $y_{11}$ by the PE1 unit 22-1 is complete.

On the next clock, a second argument pair ($c_{21}$, $y_{11}$) may be inputted to the processing element column 22 and register column 26. Meanwhile, computation on the first argument pair ($c_{11}$, $y_{11}$) continues in the PE2 unit 22-2 and register column 26. Continuing with the discussion of the first argument pair ($c_{11}$, $y_{11}$), $y_{11}$ is fed from the register 60-1 to the data input of the multiplexer 56-2 of the PE2 unit 22-2 via line 50-2. The second bit of $c_{11}$ (now stored in register 27-1) is tapped and fed via line 54-2 to the selector control input of the multiplexer 56-2. If the second bit is set, the data $y_{11}$ is selected If the second bit is clear a logic zero is selected. The multiplexer 56-2 output is fed via line 58-2 to an addition register 62-2 which also receives the partial product of the register 62-1 via line 64-1. The multiplexer 56-2 output is shifted left one bit and added to the prior partial product to produce a new a partial product. This new partial product is then stored in the addition register 62-2. The data $y_{11}$ is fed via line 52-2 to a register 60-2 where it is stored and the data $c_{11}$ is fed via lines 26-2 to a register 27-2 in the register column 26 where it is stored. The processing of the second bit of $c_{11}$ and $y_{11}$ by the PE2 unit 22-2 is complete.

On the next clock, a third argument pair ($c_{12}$, $y_{21}$) is preferably inputted to the register column 26 and processing element column 22 for processing by the PE1 unit 22-1. Computation on the first and second argument pairs ($c_{11}$, $y_{11}$),($c_{21}$, $y_{11}$) continues in the register column 26 and in the PE2 unit 22-3 and PE2 unit 22-2, respectively. Continuing with the discussion of the first argument pair ($c_{11}$, $y_{11}$), $y_{11}$ is fed from the register 60-2 to the data input of the multiplexer 56-3 of the PE2 unit 22-3 via line 50-3. The third bit of $c_{11}$ (now stored in register 27-2) is tapped and fed via line 54-3 to the selector control input of the multiplexer 56-3. If the third bit is set, the data $y_{11}$ is selected. If the third bit is clear a logic zero is selected. The multiplexer 56-3 output is fed via line 58-3 to an addition register 62-3 which also receives the partial product of the register 62-2 via line 64-2. The multiplexer 56-3 output is shifted left two bits and added to the prior partial product to produce a final product. This final product is then stored in the addition register 62-3.

On the next clock, the product in the addition register is output via line 64-3 to a selector 66-1. The selector 66-1 alternatively chooses one of the accumulators 68-1, 68-2 via switches 70-1, 70-2 for storing the products as they emerge sequentially on line 64-3. Selector 66-1 may be controlled by a clock derived from the system clock so that each switch 70-1, 70-2 is consistently alternatively closed.

Returning now to a discussion of both columns 22, 24, it may be appreciated that four products will emerge sequentially from each column, one product per column per cycle. Illustratively, the selectors 66-1 and 66-2 are sequenced to store the first and third products that emerge from each column in the registers 68-1, 68-3. Further, the selectors 66-1, 66-2 store the second and fourth products in the registers 68-2, 68-4. This ordering serves to accumulate the products correctly to produce the elements of Z. For instance, the register column 26 and first column 22 of the second stage sequentially receives the following pairs: ($c_{11}$, $y_{11}$), ($c_{21}$, $y_{11}$), ($c_{12}$, $y_{21}$), ($c_{22}$, $y_{21}$) Hence, the value $z_{11}=c_{11}y_{11}+c_{12}y_{21}$ (i.e. sum of first and third products) is produced in the accumulator 68-1 and the value $z_{21}=c_{21}y_{11}+c_{22}y_{21}$ (i.e. sum of second and fourth products) is produced in the accumulator 68-2. Similarly, the register column 26 and the second column of the second stage 24 receives, in sequence, the argument pairs ($c_{11}$, $y_{12}$), ($c_{21}$, $y_{12}$), ($c_{12}$, $y_{22}$), ($c_{22}$, $y_{22}$). The values $z_{12}=c_{11}y_{12}+c_{12}y_{12}$ and $z_{22}=c_{21}y_{12}+c_{22}y_{22}$ are respectively produced in the accumulators 68-3 and 68-4 associated with the second column 24 by respective odd and even storage selection of the selector 66-2. To achieve this task, the selector 66-2 has two switches 70-3 and 70-4 which operate in the same manner as switches 70-1 and 70-2.

It may be appreciated that both accumulators 68-1, 68-3 will simultaneously receive their first products and their third products. Hence, the sums $z_{11}$ and $z_{12}$ will be computed simultaneously and may be simultaneously outputted via lines 72-1 and 72-3 to switches 74-1 and 74-3. These switches 74-1, 74-3, which function in a manner similar to the switches 70-1 and 70-3, close enabling output to the registers 76-1 and 76-3. The registers 76-1 and 76-3 are connected in tandem by a line 80-1 so that on the next clock the element $z_{12}$ is shifted out of the register 76-3 and into the register 76-1. Meanwhile, the element $z_{11}$, stored in the register 76-1, is placed on the output line 78-1.

Similar to registers 68-1, 68-3, registers 68-2, 68-4 perform their computations simultaneously. Thus, these registers 68-2, 68-4 may simultaneously feed the elements $z_{21}$, $z_{22}$, respectively stored therein, via lines 72-2, 72-4 and switches 74-2, 74-4, to tandem registers 76-2, 76-4. The registers 76-2 and 76-4 are also connected by a line 80-2 so that, on the next clock, the element $z_{22}$ may shift from the register 76-4 to the register 76-2. Further, the element $z_{21}$ will shift from the register 76-2 to the output line 78-2. Thus, circuit 10 performs a three matrix multiplication, and illustratively, a 2×2 DCT.

Figure 2A:
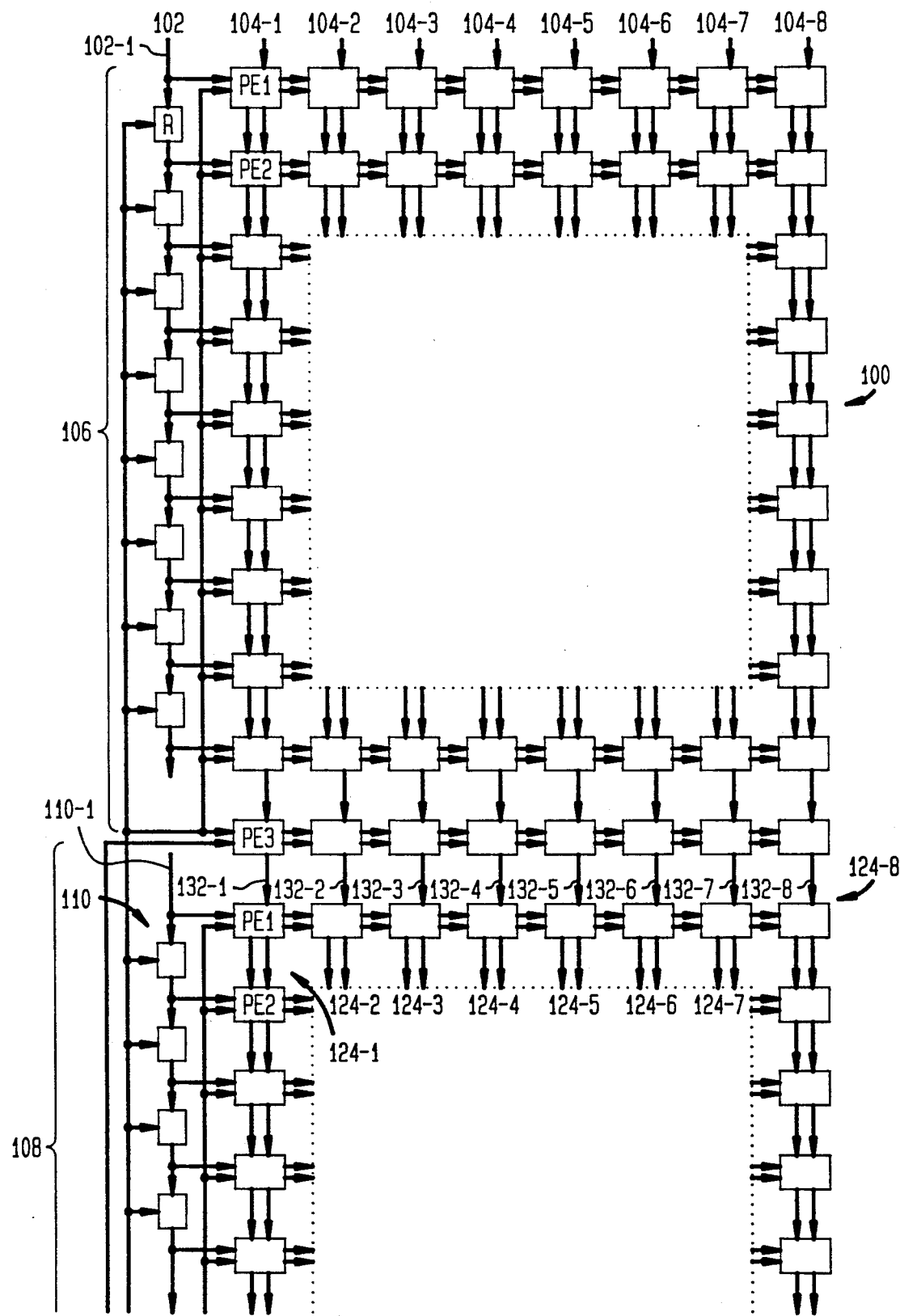
FIG. 2A depicts the top half of a modular matrix multiplier circuit.
Figures 2, 2B:
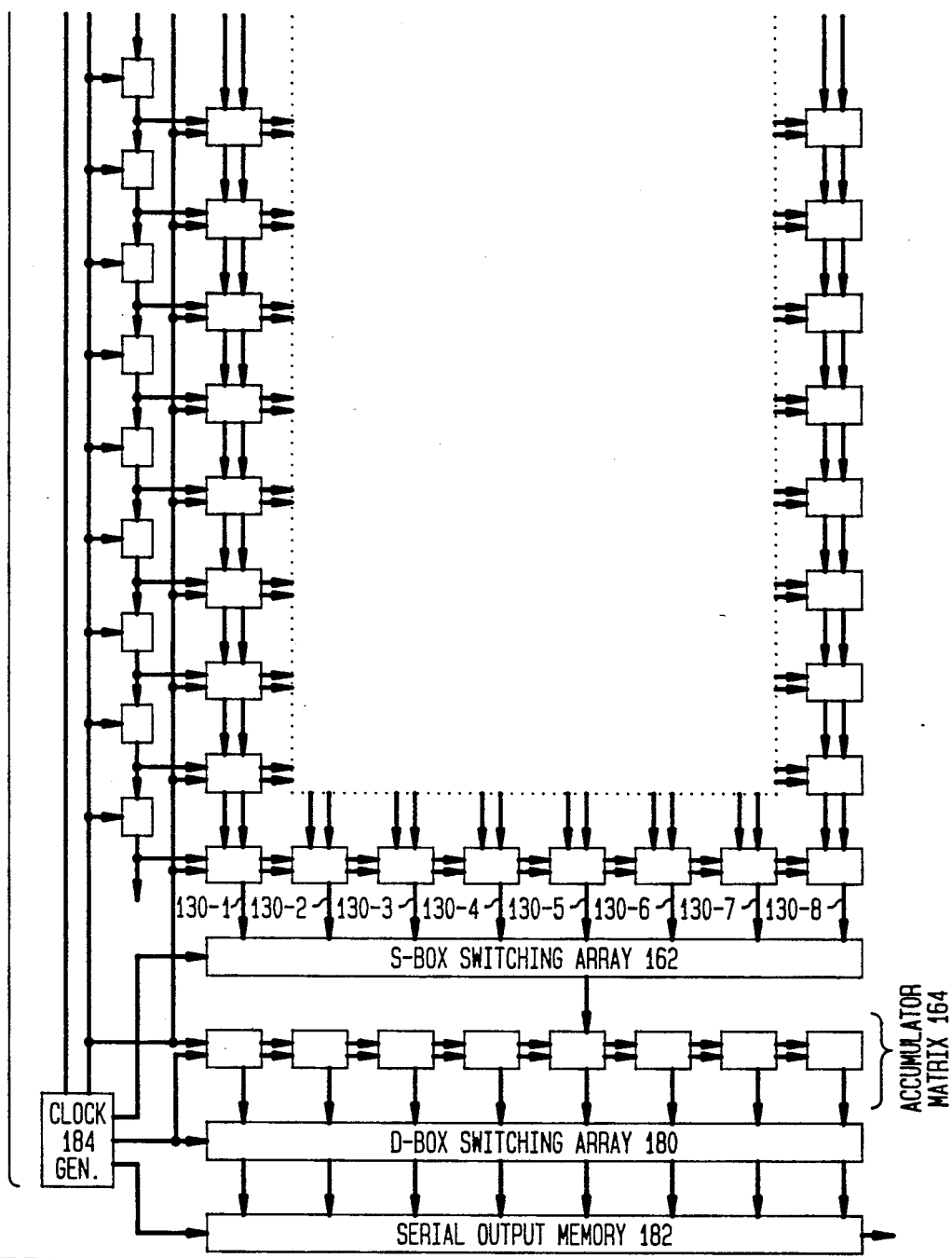
FIG. 2 depicts the relationship of FIGS. 2A and 2B.
FIG. 2B depicts the bottom half of a modular matrix multiplier circuit.
Figure 3:
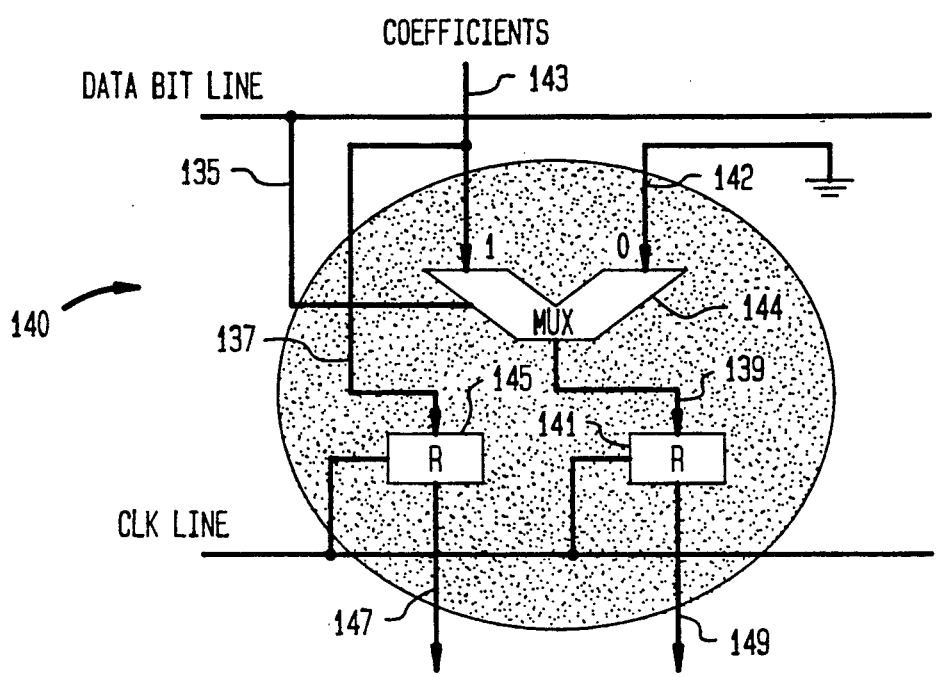
FIG. 3, FIG. 4, and FIG. 5 depict processor elements for use in the multiplier circuit of FIG. 2.

Turning now to FIG. 2 a modular circuit 100 capable of supporting an 8×8 DCT is illustrated. As before, the circuit 100 has a first stage 106 for computing $Y=XC^t$ and a second stage 108 for computing $Z=CY$. The first stage includes a register column 102 having a plurality of registers connected in tandem so that data may trickle down the column 102, one register per cycle. The first stage also has eight processing element columns 104-1 to 104-8. Each processing element column 104-1 to 104-8 has a PE1 unit at the top of the column connected to eight PE2 units in tandem. A PE1 unit 140 is depicted in FIG. 3. It is in all ways identical with the PE1 units 16-1, 18-1, 22-1, 24-1 of the circuit 10 depicted in FIG 1. In particular, the PE1 unit of FIG. 3 comprises a multiplexer 144 having a data selector input 135 and data inputs 142 and 143 The data selector input is connected to the first bit of the input to the register column 102-1 or 110-1. The matrix elements of $C^t$ or Y are input on line 143 and logic zero on line 142. The multiplexer output is fed via line 139 to register 14 where it may be outputted to a successive stage on line 149 Similarly, the $C^t$ or Y matrix elements are fed via line 137 to a register 145 where they may be outputted on line 147.

Figure 4:
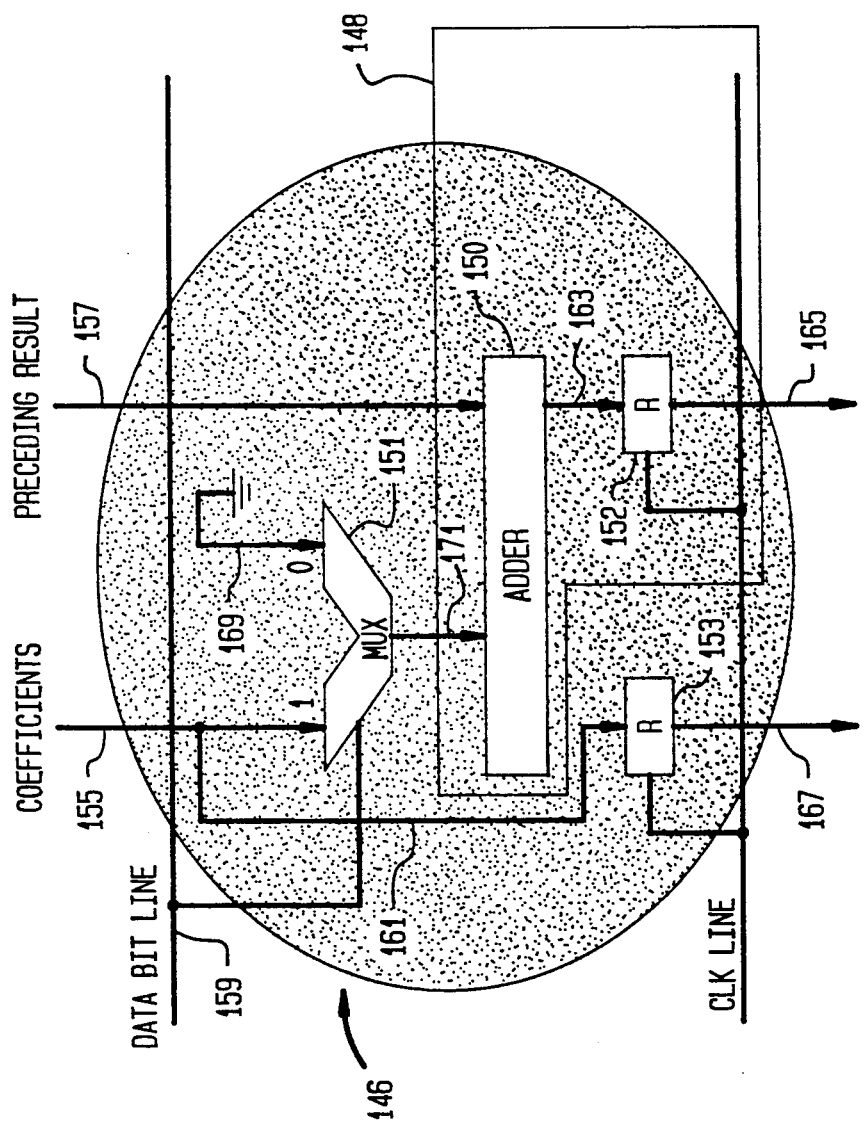

A PE2 unit 146 is shown in FIG. 4. It too is identical to the PE2 units 16-2, 16-3, 18-2, 18-3, 22-2, 22-3, 24-2, 24-3 of FIG. 1. In particular, the PE2 unit 146 of FIG. 4 comprises a multiplexer 151 having a $C^t$ or Y matrix element data input line 155, a logic zero data input line 169 and a selector control bit input line 159. Further, the multiplexer 151 output, fed via line 171, is added to the preceding result, fed via line 157, in an addition register 148. For purposes of clarity, the addition register 148 is separated into an adder circuit 150 connected via line 163 to a separate register 152 having an output line 165. Also, $C^t$ or Y matrix elements fed via line 161 to a register 153 may be subsequently output on line 167.

Figure 5:
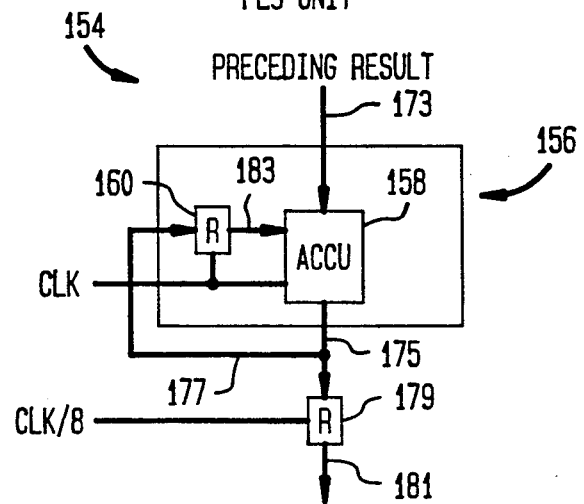

Finally, each column has a PE3 unit at its bottom, similar to those 16-4, 18-4 of FIG. 1. A PE3 unit 154 is depicted in FIG. 5. As with the addition register 148 of the PE2 unit 146 of FIG. 4, the accumulator register 156 of the PE3 unit is depicted as a separate accumulator unit 158 and register 160. A preceding result input on line 173 to the accumulator 158 is output on line 175. The results of the accumulator may be fed via line 175 to a register 179 for subsequent output on line 181 or fed back via path 177 to the register 160. A value so fed back is applied to the accumulator 158 via line 183 so that it may be added to a subsequent input result on line 173.

As with the 2×2 matrix multiplication circuit 110 of FIG. 1, the total number of PE1 and PE2 units equals the number of bits of the X matrix elements. With a total of nine PE1 and PE2 units connected in tandem, each column 104-1 to 104-8 is illustratively designed to support the multiplication of a nine bit X matrix element. This accords with the register column 102 which has eight registers. In other words, a register is provided in the register column 102 for storing the X matrix elements for input to each PE2 unit of each column 104-1 to 104-8.

As with the 2×2 matrix multiplication circuit 10 of FIG 1, each processor element of the columns 104-1 to 104-8 receives two inputs. The elements of the first data matrix X, one element per cycle, are sequentially input to the register column 102, one at a time, in the following order: $x_{11}, x_{12}, \ldots, x_{18}, x_{21}, \ldots, x_{22}, \ldots, x_{28}, \ldots, x_{88}$. These matrix elements are then shifted from register to register. The register column outputs, in consecutive cycles, an $m^{th}$ bit of each matrix element from the matrix X to the $m^{th}$ processing element of each column 104-1, ..., 104-8. As a second sequence, each processor element column 104-1 to 104-8 receives the elements of one column of the second matrix $C^t$ (one element per cycle) repeated once for each row of X (or eight times). For instance, the column 104-4 receives the following sequence: $c^t{}_{14}, \ldots, c^t{}_{84}, c^t{}_{14}, \ldots, c^t{}_{84}, c^t{}_{14}, \ldots, c^t{}_{84}, c^t{}_{14}, \ldots, c^t{}_{84}, \ldots, c^t{}_{14}, \ldots, c^5{}_{84}, c^t{}_{14}, \ldots, c^t{}_{84}, c_{t14}, \ldots, c^t{}_{84}, c^t{}_{14}, \ldots, c^t{}_{84}$. These matrix elements are passed from processing element to processing element along the column 104-4.

Each processing element column 104-1 to 104-8 outputs one column of elements of the intermediate matrix Y. The actual multiplication of arguments is very similar to that of circuit 10 of FIG. 1. It may be appreciated, however, that to calculate each element of the intermediate matrix Y in the PE3 units, the products of eight input argument pairs must be added together. This is due to the matrix multiplication formula whereby each element in a row of the first matrix X is multiplied by a corresponding element in a column of the second matrix $C^t$. All of these products are then added together to produce one element in the product matrix Y. Here there are eight elements per row of the first matrix X and per column of the second matrix $C^t$ resulting in eight products that must be added together to obtain each element in the matrix Y.

After each element of the intermediate matrix Y is calculated it is preferably outputted during each of the next eight cycles to the second stage 108 via lines 132-1 to 132-8. For instance, the column 104-7 outputs the following sequence, one element per cycle, via line 132-7: $y_{17}, y_{17}, y_{17}, y_{17}, y_{17}, y_{17}, y_{17}, y_{17}, y_{27}, y_{27}, y_{27}, y_{27}, y_{27}, y_{27}, y_{27}, y_{27}, \ldots, y_{87}$.

Like the second stage 24 of FIG. 1, the second stage 108 of the circuit 100 also has a register column 110 and eight processing element columns 124-1 to 124-8 to support an 8×8 DCT. Here, the register column has thirteen registers to support a fourteen bit multiplication. In accordance with the register column 110, each processing element column 124-1 to 124-8 has one PE1 unit and thirteen PE2 units.

As with the first stage, each processing element of the columns 124-1 to 124-8 receives two multiplication arguments per cycle. As a first multiplication argument, each processing element of the columns 124-1 to 124-8 receives, one element per cycle, one bit of an element of a third matrix C. To that end the following sequence is input, one element per cycle to the register column 110 of the second stage: $c_{11}, c_{21}, \ldots, c_{81}, c_{12}, c_{22}, \ldots, c_{82}, \ldots, c_{88}$. Therefrom, on consecutive cycles, the $p^{th}$ bit of every element of C is inputted to a $p^{th}$ processing element of each column 124-1 to 124-8. As a second multiplication argument, each processing element column 124-1 to 124-8 simultaneously receives, one element at a time, the elements of one column of the intermediate matrix Y. These elements are repeatedly outputted from the PE3 unit of the columns 104-1 to 104-8 of the first stage 106 via lines 132-1 to 132-8 directly above the corresponding column 124-1 to 124-8 of the second stage 108. Again, the actual multiplication of arguments is similar to that of the circuit 10 of FIG. 1.

The final products of each input argument pair are outputted from the PE2 unit at the bottom of each column 124-1 to 124-8 via lines 130-1 to 130-8. As with the 2×2 matrix multiplier circuit 10 of FIG. 1, these products must be alternatively accumulated to form the final product matrix elements of Z. To compute one element in the first row of Z, the first product and every eighth product thereafter which is output on one of the lines 130-1 to 130-8 must be accumulated. Similarly, to compute one element of the second row of Z the second product and every eighth product thereafter which is output on one of the lines 130-1 to 130-8 must be accumulated. It may be appreciated that to calculate one element in a $l^{th}$ row of Z (where l is an index from 1, ..., 8) the $l^{th}$ product and every eighth product thereafter, up to the $LK^{th}$ product, which is output on one of the lines 130-1 to 130-8 must be added together. Further, as with the circuit 10 of FIG. 1, the column k of the element of Z thus computed is the same as the column of the second multiplication arguments inputted from the sub-product matrix Y to that particular processing element column 124-1 to 124-8. For instance, if the processing element column 124-3 receives, on line 132-3, sub-product matrix elements from the column: $y_{13}, \ldots, y_{83}$ then that column will output, on line 130-3, products which may be added to compute the elements $z_{13}, \ldots, z_{83}$.

In order to properly accumulate the products as they are output, the circuit 100 is illustratively provided with an S-BOX switching array 162 and a matrix of accumulator arrays 164. Further, the circuit 100 also has a D-BOX switching array 180 and a serial output memory 182 for outputting the calculated Z matrix elements from the circuit 100. These elements are shown in greater detail in FIG. 6. FIG. 6(a) shows the S-BOX in greater detail and FIG. 6(b) shows the D-BOX in greater detail. FIG. 7 shows the timing signals for these components.

Figure 6:
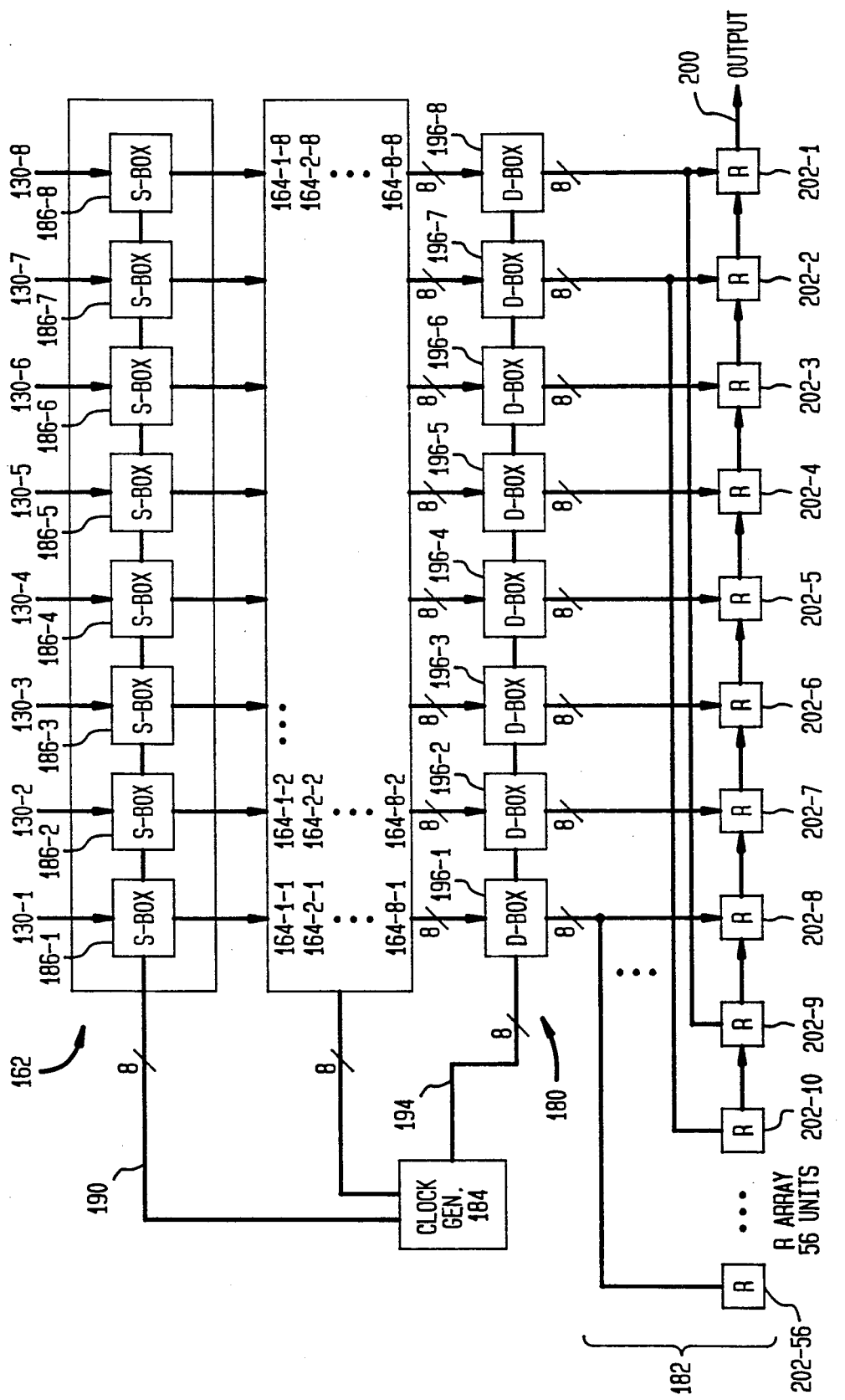
FIG. 6 depicts first and second switching arrays connected to an accumulator matrix for use in the circuit of FIG. 2.
Figure 6A:
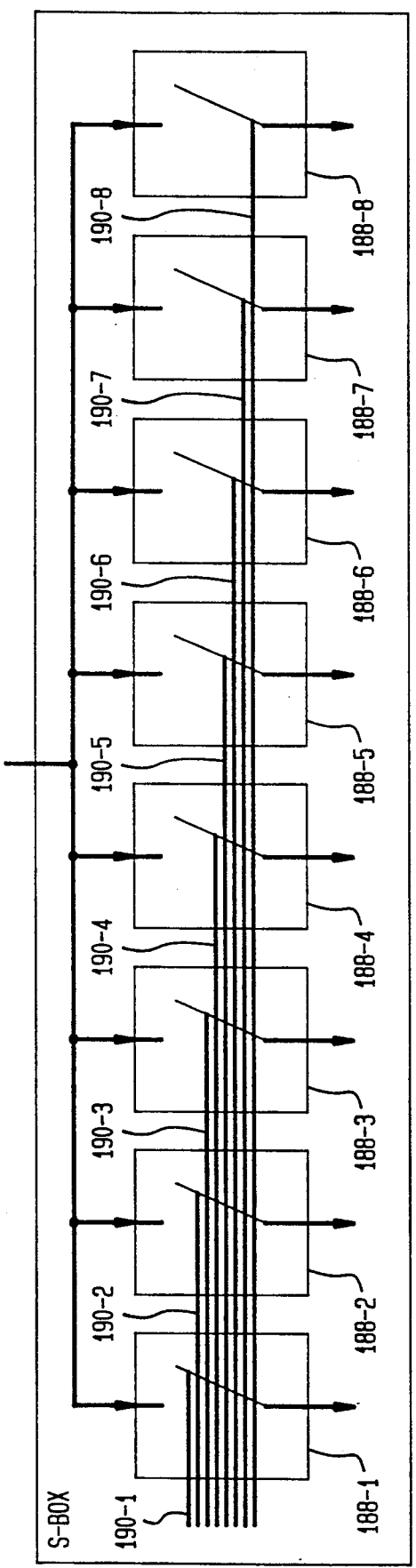
FIG. 6(a) depicts a detailed view of an S-BOX.
Figure 6B:
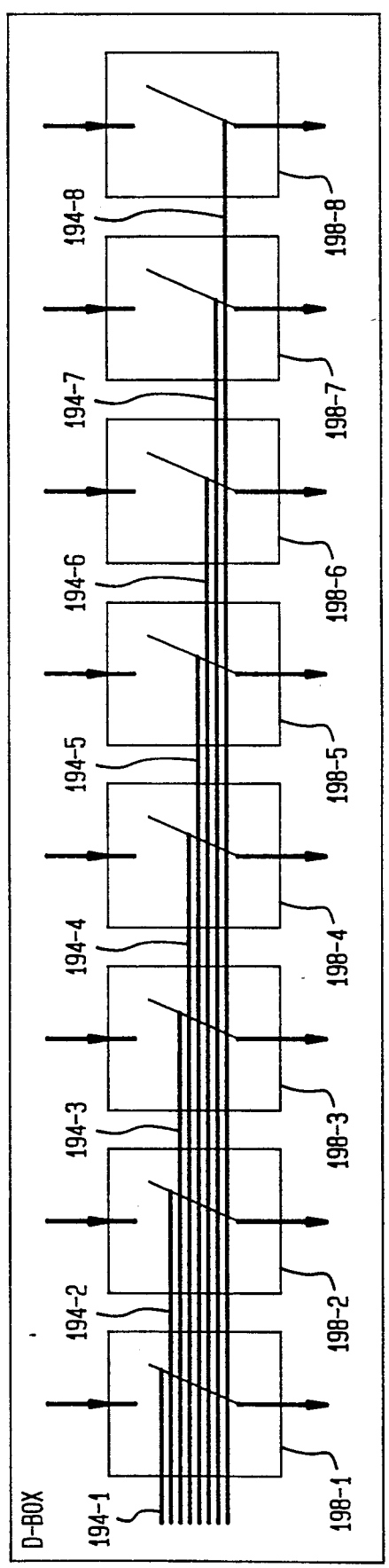
FIG. 6(b) a detailed view of a D-BOX.
Figure 7:
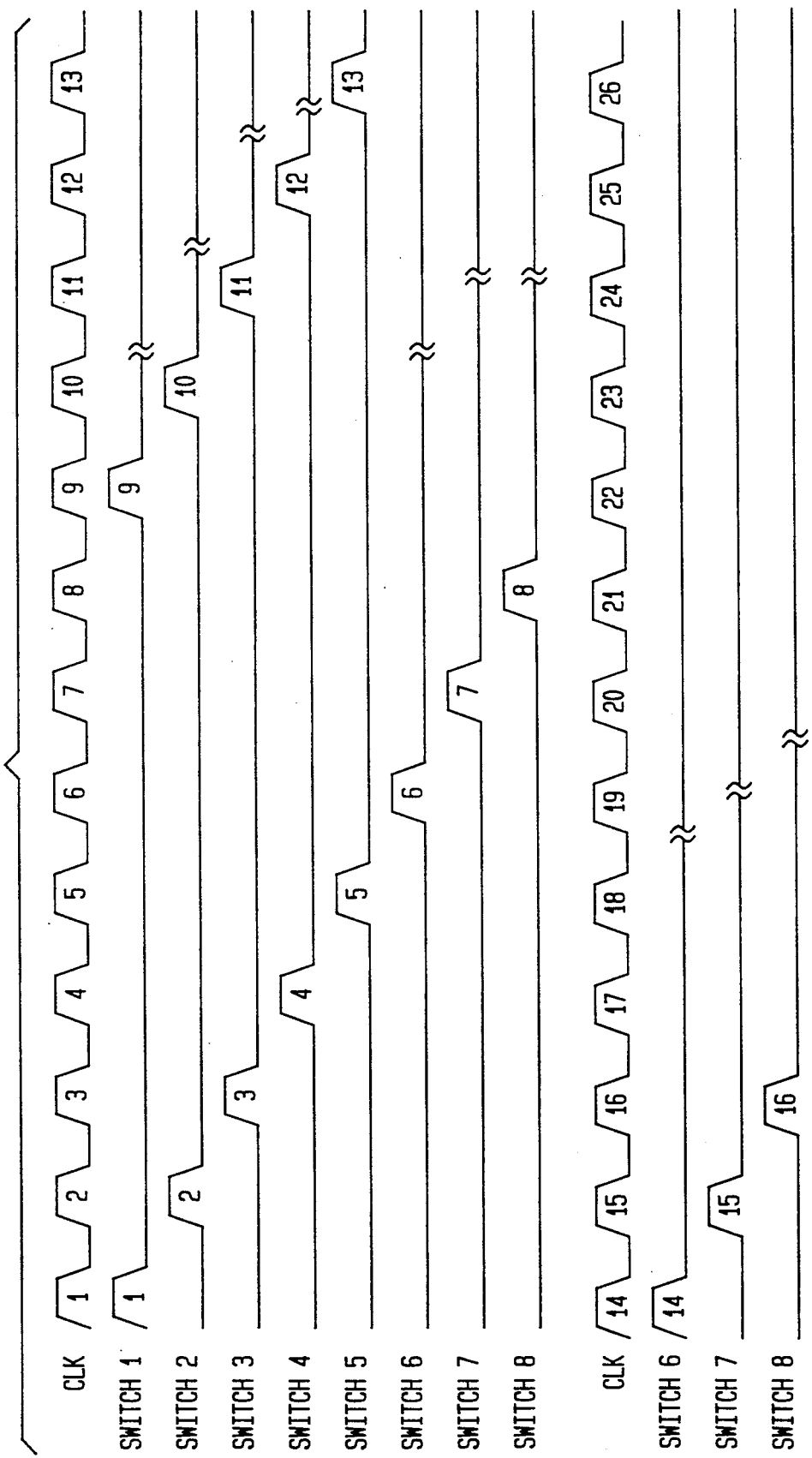
FIG. 7 depicts a timing diagram illustrating the operation of the circuit of FIG. 6.

Referring now to FIGS. 6 and 6(a), the operation of the S-BOX array 162 and accumulators 164-1-1 ... 164-8-8 will be explained in greater detail. The accumulator matrix 164 is comprised of separate accumulators 164-1-1, ..., 164-8-8. Illustratively, there are L rows and K columns of accumulators so that there is a corresponding accumulator for every element of Z. In the preferred embodiment of the invention, the products necessary to compute an element of a particular column k of Z only appear on a corresponding $k^{th}$ output line of the lines 130-1, ..., 130-8. Hence, every column of accumulators, e.g., 164-1-1, ..., 164-8-1 corresponds to one of the output lines 130-1, ..., 130-8 and the accumulators of one column, e.g., 164-1-3, ..., 164-8-3 only receive products from one line 130-1, ..., 130-8. As depicted in FIG. 7, the cycles are counted from one as a first group of products $c_{11}y_{11}, c_{11}y_{12}, \ldots, c_{11}y_{18}$ are respectively outputted onto lines 130-1 to 130-8. A pulse appears on a clock line 190-1 closing a first switch 188-1 (FIG. 6(a)) in each S-BOX 186-1 to 186-8 (FIG. 6) enabling data flow from the lines 130-1 to 130-8 to the first accumulators 164-1-1, ..., 164-1-8 of each column, i.e , the first row of accumulators. On clock two, a second group of products $c_{21}y_{11}, c_{21}y_{12}, \ldots, c_{21}y_{18}$, which must be accumulated to produce elements of a second row of Z are respectively outputted on lines 130-1 to 130-8. A pulse appears on the clock line 190-2 closing the second switch 188-2 in each S-BOX 186-1 to 186-8 (see FIG. 7) enabling data flow from lines 130-1 to 130-8, respectively, to accumulators of the second row 164-2-1, ..., 164-2-8. One may extrapolate from the timing diagram of FIG. 7 that each row of accumulators are alternatively selected on cycles one through eight by closing the appropriate switch 188-1, 188-2, 188-3, 188-4, 188-5, 188-6, 188-7 or 188-8 of each S-BOX 186-1, ..., 186-8. Further, this selection process repeats itself every eight cycles. Thus, the accumulators 164-1-1,..., 164-8-8 selectively accumulate the products output on lines 130-1 to 130-8 to produce the elements of Z in accordance with the previously discussed strategy.

To close the switches 188-1 to 188-8 alternatively on different cycles, the circuit 100 of FIG. 2 is provide with a clock generator 184. This clock generator 184 supplies via a plurality of clock lines 190 (having lines 190-1 to 190-8), to each S-BOX 186-1, ... 186-8 a sequence of eight pulses. On the first clock of FIG. 7 only line 190-1 (FIG. 6(a)) receives a pulse which closes the first switch 188-1 of each S-BOX 186-1 to 186-8. On the second clock, only line 190-2 (FIG. 6(a)) receives a pulse which closes the second switch 188-2 of each S-BOX 186-1 to 186-8. At a cycle t, the t mod 8 line of clock line 190 receives a pulse closing the t mod 8 switch of each S-BOX 186-1 to 186-8 enabling data transfer of the products appearing on lines 130-1 to 130-8 to the accumulators of the t mod 8 row of the accumulator matrix 164.

As per the above process, of the products appearing on lines 130-1 to 130-8, the $1^{th}$, $9^{th}$, $17^{th}$, $25^{th}$, $33^{rd}$, $41^{st}$, $49^{th}$ and $57^{th}$ products of each line 130-1 to 130-8 are respectively stored in the first row of accumulators 164-1-1, ..., 164-1-8 of the accumulator matrix 164. Thus, after clock fifty-seven, computation on the values of the first row of accumulators 164-1-1, ..., 164-1-8 is complete. On clock fifty-eight, although the remaining rows of accumulators 164-2-1, ..., 164-208, 164-3-1, ... 164-8-8 have not completed their calculations, the first row of accumulators 164-1-1, ..., 164-1-8 preferably shift the elements of Z stored therein (i.e., the first row of Z, $z_{11}$, ..., $z_{18}$) to the serial output memory 182. The serial output memory 182 comprises fifty-six registers 202-1 to 202-56 connected in tandem so that data stored in the registers 202-1 to 202-56 propagates to the right one register per clock towards an output line 200. Thus, by loading the elements into the serial output memory 182 they may be outputted serially from the output line 200. To that end, the circuit 100 of FIG. 2 is provided with a D-BOX array 180 comprised of one D-BOX 196-1 to 196-8.

Referring now to FIG. 6 in conjunction with FIG. 6(b), the outputting of the elements of Z is described. Similar to the S-BOX's 186-1 to 186-8 each D-BOX 196-1 to 196-8 comprises eight individual switches 198-1 to 198-8, each switch separably controllable by clock lines 194 (having lines 194-1 to 194-8). Each D-BOX 186-1 to 186-8 is preferably provided for routing the output of the accumulators of one column of the accumulator matrix 164. Further, each switch 198-1 to 198-8 (see FIG. 6(b)) is preferably designed for routing the output of one accumulator within a particular column of the accumulator matrix 164. On clock fifty eight, one element is preferably removed from each accumulator 164-1-1, ..., 164-1-8 of the first row of the accumulator matrix 164 by the first switch 198-1 of each D-BOX 196-1 to 196-8. To that end, the clock generator 184 generates a pulse on line 194-1 thereby closing switch 198-1 in each D-BOX 196-1 to 196-8. The element $z_{11}$ is routed from the accumulator 164-1-1 directly to the output line 200 by the D-BOX 196-8. The other seven elements of accumulators 164-1-2, ..., 164-1-8 are loaded into the rightmost seven registers 202-1 to 202-7 of the serial output memory 182 in the order $z_{12}$, ..., $z_{18}$ by the D-BOX's 196-2 to 196-8.

On clock fifty-eight, it may be appreciated that the second row of accumulators 164-2-1, ..., 164-2-8 complete their calculation of the second row of elements of Z, $z_{21}$, ..., $z_{28}$. Thus, on clock fifty-nine the second row of elements of Z, $z_{21}$, ..., $z_{28}$ may be shifted out of the second row of accumulators 164-2-1, ..., 164-2-8 and into the next eight rightmost registers of the serial output memory 182. To that end, the clock generator 184 generates a pulse on clock line 194-2 thereby closing the switch 198-2 of each D-BOX 196-1 to 196-8. The elements of the second row of accumulators 164-2-1, ..., 164-2-8 may thus be loaded into the serial output memory 182. The loading of the second row of elements 164-2-1, ..., 164-2-8 takes into account the shifting of the elements in the seven rightmost registers 202-1 to 202-7 one register to the right. Thus, at the falling edge of clock fifty nine, $z_{12}$ is shifted out On line 200 and the elements $z_{13}$, ... $z_{18}$, $z_{21}$, ..., $z_{28}$ occupy the fourteen right most registers 202-1 to 202-14 (in that order). This process may be continued with the remaining rows of accumulators 164-3-1, ..., 164-3-8, 164-4-1, ..., 164-8-8 on each of the next six clocks. Thus, on clock sixty five, all fifty six registers 202-1 to 202-56 are filled with the elements of rows two through eight of the product matrix Z.

To sequence the above output operation, the clock generator 184 provides a plurality of clock lines 194. These lines 194-1 to 194-8 receive a pulse alternatively on clocks fifty eight through sixty five. After clock sixty-five, the D-BOX clock lines 194 are disabled for at least fifty-six clocks. During this period, the serial output memory 182 shifts out the elements stored within its fifty-six registers 202-1 to 202-56. Thus, for every clock from sixty-six through one hundred twenty-one the elements in the registers 202-1 to 202-56 shift to the right, one register per cycle, the rightmost register 202-1 outputting its element on line 200.

Returning to FIG. 2, the preferred embodiment of the invention is adapted to support successive throughput of input matrices. After the first two matrices X and $C^t$ of a first matrix multiplication have been input to the first stage 106, a second pair of matrices X' and $C^{t'}$ of a second matrix multiplication may be input to the circuit 100. The processing of each multiplication is the same and occurs in succession. For instance, on the cycle following the inputting of the last argument pairs of the matrices X and $C^t$ are inputted to the columns 104-1 to 104-8 the first argument pairs of the matrices X' and $C^{t'}$ may be inputted to the columns 104-1 to 104-8.

It may be appreciated that in the computation of a DCT as opposed to an arbitrary three-matrix multiplication, two matrices, namely C and $C^t$, are fixed. As such, the elements of these matrices may be stored in a fashion which supports efficient input to the circuit 100. The circuits of FIGS. 8(a)-8(c) depict such an efficient means.

Figure 8A:
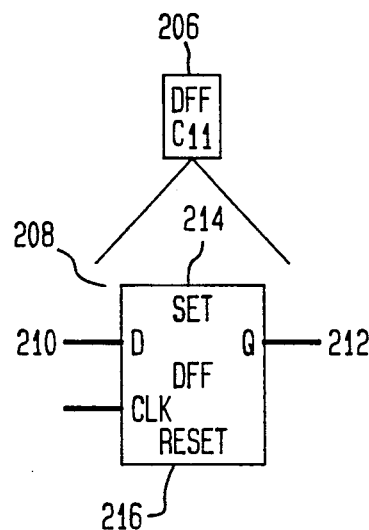
FIG. 8(a) depicts a register used in an exemplary coefficient supply circuit.
Figure 8B:
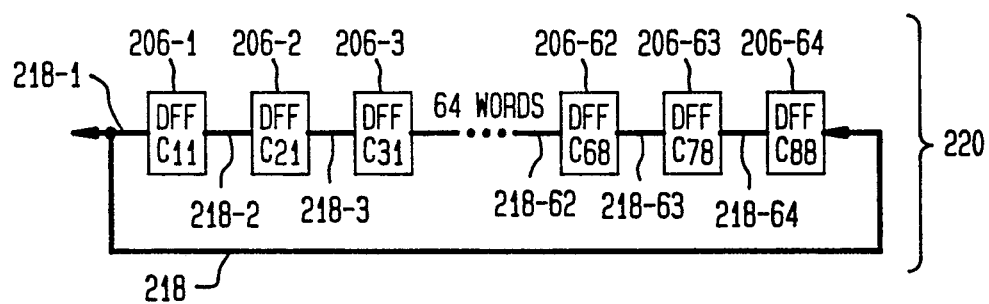
FIG. 8(b)-(c) depict exemplary coefficient supply circuits.
Figure 8C:
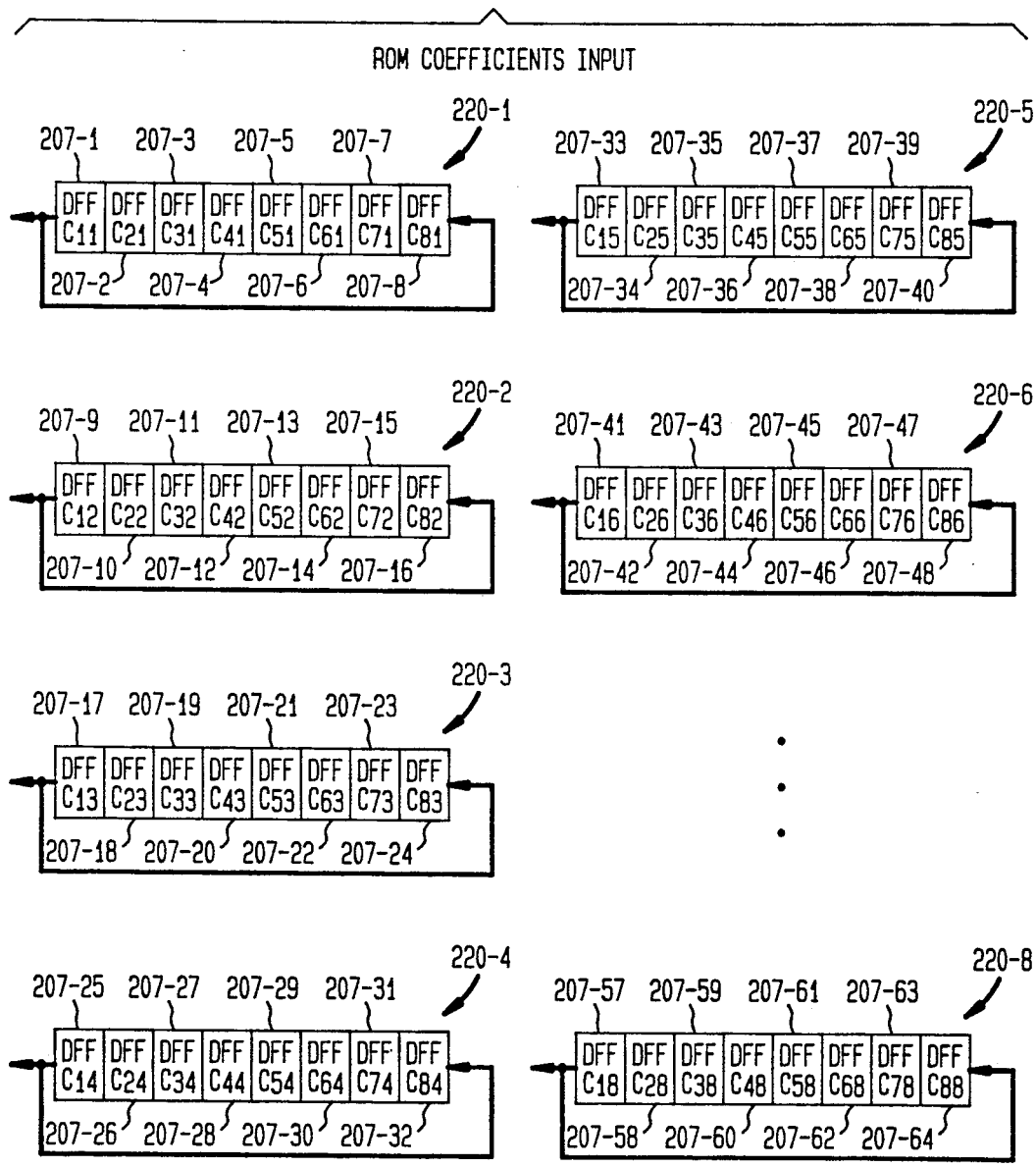

FIG. 8(a) depicts a typical register 206 used in constructing an efficient coefficient supply means. The register comprises a plurality of D flip-flops 208 each having a D input 210, Q output, 212, set 214 and reset 216 terminals. FIG. 8(b) depicts an arrangement 220 for supplying coefficients to the register column 110 of circuit 100 of FIG. 2. A plurality of sixty-four registers 206-1, 206-2, 206-3, ..., 206-62, 206-63, 206-64, one for each element of the matrix C, are connected in a ring structure. The D input (NOT SHOWN) of each register 206-1, 206-2, 206-3, ..., 206-62, 206-63, 206-64 is connected to the Q output (NOT SHOWN) via lines 218-2, 218-3, ..., 218-62, 218-63, 218-64 of its neighbor immediately to the right. Additionally, the D input (NOT SHOWN) of the rightmost register 206-64 is connected via line 218-1 to the Q (NOT SHOWN) of the leftmost register 206-1. Thus, on every clock, the elements rotate counterclockwise one register. Further, the Q output of one register 206-1 is additionally connected to the input line 110-1 of the register column 110. Thus, as the elements rotate through the register 206-1 they are inputted to the register column 110. It may be appreciated that in sixty four clocks, each of the elements will be input to the register column 110 and the supply circuit 220 will return to its original state.

A modified coefficient supply circuit may be used in the first stage 106 to supply the elements of each column of $C'$ to each processing element column 104-1 to 104-8. As depicted in FIG. 8(c) circuits 220-1, 220-2, ..., 220-8 are each depicted having eight registers each 207-1 to 207-64 connected in a ring as before. In the preferred embodiment, these circuits 220-1, 220-2, ..., 220-8 store eight elements which may be inputted eight times each, per DCT, to each column 104-1 to 104-8 Their operation is otherwise the same as with the circuit 220 before.

Figure 9B:
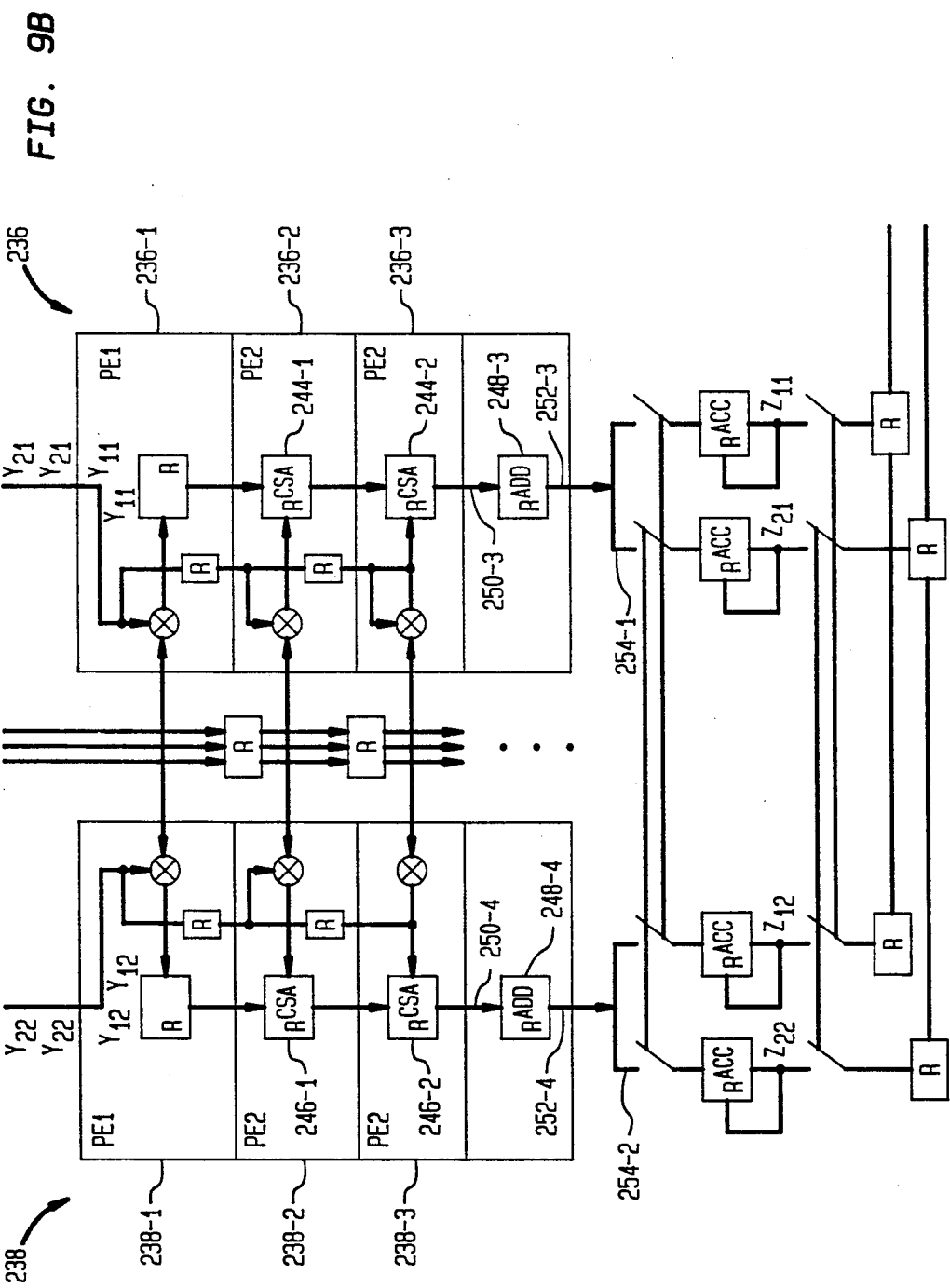
FIG. 9B depicts the bottom half of an alternative embodiment of the present invention with a carry save adder.

Turning now to FIG. 9, an enhanced matrix multiplier circuit 230, capable of supporting a 2×2 DCT is shown. The circuit is in many ways similar to the circuit 10 of FIG. 1 with two key differences. In each PE2 unit 232-2, 232-3, 234-2, 234-3, 236-2, 236-3, 238-2, 238-3 of each processing element column 232, 234, 236, 238, the addition registers have been replaced by carry save addition registers 240-1, 240-2, 242-1, 242-2, 244-1, 244-2, 246-1, 246-2 which will be discussed in more detail below. Also, at the bottom of each of the last PE2 stages 232-3, 234-3, 236-3, 238-3, an addition register 248-1 to 248-4 has been interposed between the output line 250-1 to 250-4 of the last PE2 unit 232-3, 234-3, 236-3, 238-3 and the input line 252-1, 252-2 to the PE3 unit 232-4, 234-4 Or the input line 252-3, 252-4 to the selectors 254-1, 254-2. With the exception of these two changes, the operation of the circuit 230 is otherwise the same as the operation of the circuit 10 of FIG. 1.

Figure 10:
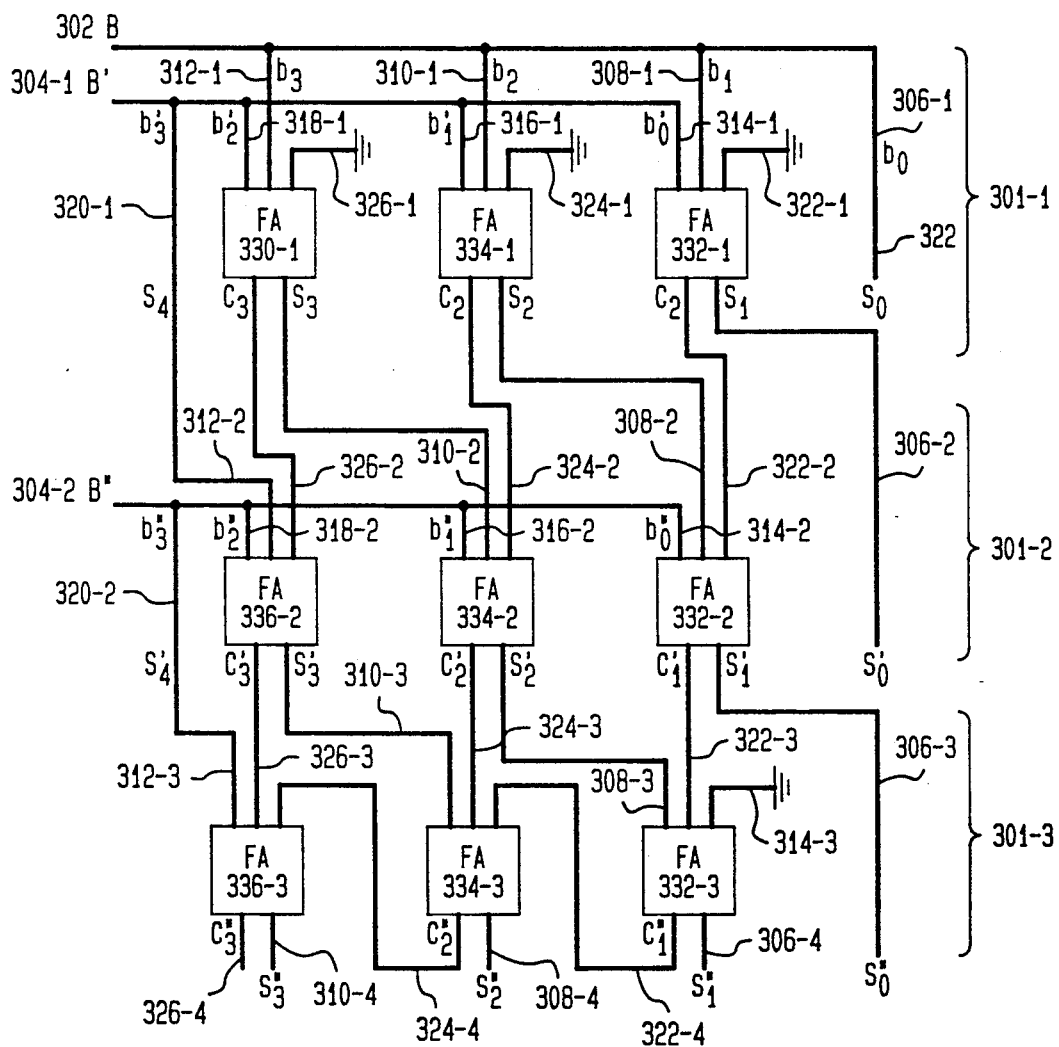
FIG. 10 depicts a carry save adder.

Turning now to FIG. 10, the operation of the addition circuits of the carry save adder registers 240-1, 240-2, 242-1, 242-2, 244-1, 244-2, 246-1, 246-2 and interposed addition registers 248-1 to 248-4 will be discussed in more detail. A carry save adder circuit 300 having two carry save addition stages 301-1 and 301-2 and a final addition stage 301-3 is depicted. Each stage 301-1, 301-2, 301-3 corresponds to the adder circuit of one carry save register in each PE2 unit of a processing element column. For example, in the column 232, circuit 301-1 corresponds to the carry save adder register 240-1, stage 301-2 corresponds to the register 240-2 and stage 301-3 to the addition register 248-1. In FIG. 10, the stages 301-1, 301-2, 301-3 are shown Connected directly to one another. In an actual implementation, however, a register would be interposed at the output of each stage 301-1, 301-2, 301-3.

The operation of an individual adder stage 301-1 is now described. The adder stage 301-1 illustratively comprises three full adder circuits 332-1, 334-1, 336-1.

Hence, all of the stages 301-1, 301-2, 301-3 depicted in FIG. 10 illustratively add values of four bits each. It may be appreciated, however, that the addition of any number of bits may be accommodated by connecting more full adders in a similar fashion.

In the first PE2 unit of a column, e.g., 232-2, a bit product must be shifted left one bit and added to the product of the PE1 unit. The product of the PE1 unit, referred to as "B", is fed via lines 302 to the adder stage 301-1. The value B comprises four bits labeled $b_3b_2b_1b_0$ which are respectively input on lines 312-1, 310-1, 308-1, 306-1. The product of the PE2 unit, referred to as "B'," is fed via lines 304-1 to the adder stage 301-1. The value B' comprises four bits labeled $b_3'b_2'b_1'b_0'$ which are respectively input on lines 320-1, 318-1, 316-1, 314-1. The third input 322-1, 324-1, 326-1 of each full adder 332-1, 334-1, 336-1 in this stage 301-1 is grounded. Alternatively, half adders may be used in the first adder stage 301-1.

The sum and carry of the two values B and B' are respectively represented by the labels "S" and "C" and respectively comprise five bits labeled $s_4s_3s_2s_1s_0$ and three bits labeled $c_3c_2c_1$. The inputs of the first adder stage 301-1 as depicted in FIG. 10 reflect a left shift or left offset of the value B' with respect to the value B. Thus, $b_0$ input on line 306-1 forms the lowest order sum bit $s_0$. Similarly, the bit $b_3'$, input on line 320-1 forms the highest order sum bit $s_4$. The bits $b_1$ and $b_0'$ of lines 308-1, 314-1 are added in the full adder 332-1 to produce the sum bit $s_1$ and carry bit $c_1$ on lines 306-2 and 322-2, respectively. The bits $b_2$ and $b_1'$ of lines 310-1, 316-1 are added in the full adder 334-1 to produce the sum bit $s_2$ and carry bit $c_2$ on lines 308-2 and 314-2, respectively. Finally, the bits $b_3$ and $b_2'$ of lines 312-1, 318-1 are added in the full adder 336-1 to produce the sum bit $s_3$ and carry bit $c_3$ on lines 310-2 and 326-2, respectively. Thus, a first carry save addition of two values B and B' is performed in a first adder stage 301-1.

On the next stage 301-2, the addition of the product labeled "B''" produced on a second PE2 stage, e.g., 232-3 (see FIG. 9) and a previous PE2 stage result, e.g., 232-2 is detailed. The value B'' appearing On line 304-2 is added to S and C to produce a new sum and carry labeled S' and C', In FIG. 10, B'' comprises four bits labeled $b_3''b_2''b_1''b_0''$ which respectively appear on lines 320-2, 318-2, 316-2, 314-2. The values S' and C' respectively comprise five bits labeled $s_4's_3's_2's_1's_0'$ and three bits labeled $c_3'c_2'c_1'$. On account of the subsequent left shift of B'', $s_1$, input on line 306-2 forms the lowest bit $s_0'$ of the second sum and $b_3''$ forms the highest order bit $s_4'$. The bits $s_2$, $c_1$ and $b_0''$ of lines 308-2, 322-2, 314-2 are added in the full adder 332-2 to produce the sum bit $s_1'$ and carry bit $c_1'$ on lines 306-3 and 322-3, respectively. The bits $s_3$, $c_2$ and $b_1''$ of lines 310-2, 324-2, 316-2 are added in the full adder 334-2 to produce the sum bit $s_2'$ and carry bit $c_2'$ on lines 308-3 and 324-3, respectively. Finally, the bits $s_4$, $c_3$ and $b_2''$ of lines 312-2, 326-2, 318-2 are added in the full adder 336-2 to produce the sum bit $s_3'$ and carry bit $c_3'$ on lines 310-3 and 316-3, respectively. Thus, a first carry save addition of two values B'' and a previous addition represented by S and C is performed in a second adder stage 301-2. It may be appreciated that additional adder stages could be appended to perform additions with more values. This would correspond to adding PE2 units to the columns 232, 234, 236, 238 (see FIG. 9).

Finally, after the final bit multiplication is performed in a particular column, e.g., 232 of FIG. 9, the sum and carry S' and C' must be added together. The adder registers 248-1 to 248-4 (see FIG. 9) include a conventional adder circuit for performing such a task. As depicted in FIG. 10, a conventional adder stage 301-3 receives the sum S' and carry C' and produces a seven bit final sum having the bits $c_3''s_3''s_2''s_1''s_0''s_0's_0$. The three lowest order bits $s_0''s_0's_0$ require no computations and are respectively output on lines 306-3, 306-2, 306-1. The bits $c_1'$ and $s_2'$ are input via lines 322-3, 308-3 (the third input 314-3 is grounded) to a full adder 332-3 to produce a sum bit $s_1''$ and carry bit $c_1''$ on lines 306-4, 322-4 respectively. The bit $c_1''$ is input along with the bits $c_2'$ and $s_3'$, via lines 324-4, 324-3, 310-3, to a full adder 334-3 to produce a sum bit $s_2''$ and carry bit $c_2''$ on lines 308-4, 324-4, respectively. Finally, the bit $c_2''$ is input along with the bits $c_3'$ and $s_4'$, via lines 324-4, 326-3, 312-3, to a full adder 336-3 to produce a sum bit $s_3''$ and carry bit $c_3''$ on lines 310-4, 326-4, respectively. Thus, using a normal addition register, the sum and carry S' and C' may be added to produce a final sum in a final addition stage 301-3.

Finally, the aforementioned embodiments are intended to be illustrative only. Numerous other embodiments may be envisioned by those skilled in the art without departing from the following claims.

We claim:

1. A matrix multiplication circuit comprising:
a first stage for multiplying a first matrix X having elements $x_{ij}$, $i=1 \ldots I$, $j=1 \ldots J$ with a second matrix A having elements $a_{jk}$, $k=1 \ldots k$, said first stage comprising:
a first plurality of pipeline circuits which operate in parallel, each pipeline circuit for sequentially outputting the elements:

$$y_{ik} = \sum_{j=1}^{J} x_{ij} a_{jk}$$

of an intermediate product matrix $Y = X \cdot Z$ for a particular value of k; and
a second stage for receiving the elements $y_{ik}$ as said elements $y_{ik}$ are output by the first stage and for multiplying said elements $y_{ik}$ with a third matrix C having elements $c_{li}$, said second stage comprising:
a second plurality of pipeline circuits which operate in parallel, each pipeline circuit of the second stage for sequentially outputting the products $c_{li}y_{ik}$ for a particular value k; and
associated accumulator means, each accumulator means for selectively accumulating products $c_{li}y_{ik}$ for particular values of l from the associated pipeline circuit so that each accumulator means generates the elements $$z_{lk} = \sum_{i=1}^{I} c_{li} y_{ik}$$

of a product matrix $Z = C \cdot Y$.

2. The circuit of claim 1 wherein the matrix c comprises sampled cosine coefficients, the matrix A is the transpose of the sampled cosine coefficient matrix C and the matrix X comprises data to be transformed.

3. The circuit of claim 1 wherein each accumulator means comprises:
a selector means connected to each of said pipeline circuits for alternatively routing the products output therefrom;

a plurality of accumulators, one for each row of said product matrix Z, connected to each selector means, said selector means selecting the t mod L accumulator of said associated plurality of accumulators, to receive the $t^{th}$ output product from said pipeline circuit, where t is the number of said product outputted to said selector means from the associated pipeline circuit.

4. A matrix multiplication circuit comprising:
a first stage for multiplying a first matrix X having elements $x_{ij}$, $i=1 \ldots I$, $j=1 \ldots J$ with a second matrix $C^t$ having elements $c^t_{jk}$, $k=1 \ldots K$, said first stage comprising:
a first plurality of pipeline circuits which operate in parallel, each pipeline circuit for sequentially outputting the elements:

$$y_{ik} = \sum_{j=1}^{J} x_{ij} c^t_{jk}$$

of an intermediate matrix for a particular value of k; and
a second stage for receiving the elements $y_{ik}$ as said elements $y_{ik}$ are output by the first stage and for multiplying said elements $y_{ik}$ with a third matrix C having elements $C_{li}$, said second stage comprising:
a second plurality of pipeline circuits which operate in parallel, each pipeline circuit of the second stage for sequentially outputting the products $c_{li}y_{ik}$ for a particular value k; and
associated accumulator means, each accumulator means for selectively accumulating products $c_{li}y_{ik}$ for particular values of l from the associated pipeline circuit so that each accumulator means generates the sum $$z_{lk} = \sum_{i=1}^{I} c_{li} y_{ik},$$

wherein each pipeline circuit of the first stage, for multiplying the elements of a first sequence $x_{11}, x_{12}, \ldots, z_{11}, x_{21}, x_{22}, \ldots x_{21}, \ldots, x_{11}$ with the elements of a second sequence comprising I repetitions of the sequence: $c^t_{1k}, c^t_{2k}, \ldots, c^t_{Jk}$ for a particular value of k, comprises:
a first processing element simultaneously receiving two inputs per cycle comprising the first bit of each element of said first sequence and each element of said second sequence, said first processing element outputting the products of said two inputs thereto, one per cycle;
a plurality of processing elements labeled, 2, ..., m, ..., M, where M is the number of bits of each element of said first sequence, the $m^{th}$ processing element receiving two inputs per cycle comprising the $m^{th}$ bit of an element of said first sequence and a corresponding element of said second sequence, said $m^{th}$ processing element outputting the sum of the product of said two inputs thereto and the sum of the $m-1^{th}$ processing element.

5. The circuit of claim 4 wherein each of said first processing elements comprises:
a register for storing each element of said second sequence;
a multiplexer receiving the first bit of said first sequence elements as a selector control input, and said second sequence elements as a data input, said multiplexer selecting said second sequence element if said bit equals a logic one and selecting a logic zero if said bit equals a logic zero; and an accumulation means for storing the output of said multiplexer.

6. The circuit of claim 4 wherein each of said processing elements, except for the first comprises:

a register for storing said second sequence elements;

a multiplexer, the multiplexer of the $m^{th}$ processing element receiving the $m^{th}$ bit of said second sequence elements as a selector control input, and said second sequence elements from said register of the $m-1^{th}$ processor element as a data input, said multiplexer selecting the second sequence element if said bit equals a logic one and selecting a logic zero if said bit equals a logic zero; and an accumulation means for computing and storing the sum of the output of said multiplexer, shifted left $m-1$ bits, and the value stored in the accumulation means of the $m-1^{th}$ stage.

7. The circuit of claim 6 wherein said accumulation means comprise carry-save adder circuits.

8. The circuit of claim 4 wherein said first stage further comprises a plurality of registers connected in tandem, said registers receiving said first sequence and outputting the $m^{th}$ bit of each element on consecutive cycles to the corresponding $m^{th}$ processing element of each processing pipeline.

9. A matrix multiplication circuit comprising:

a first stage for multiplying a first matrix X having elements $x_{ij}$, $i=1 \ldots I$, $j=1 \ldots J$ with a second matrix $C_l$ having elements $c'_{jk}$, $k=1 \ldots K$, said first stage comprising:

a first plurality of pipeline circuits which operate in parallel, each pipeline circuit for sequentially outputting the elements:

$$Y_{ik} = \sum_{j=1}^{J} x_{ij} c_{jk}'$$

of an intermediate matrix for a particular value of k; and a second stage for receiving the elements $y_{ik}$ as said elements $y_{ik}$ are output by the first stage for multiplying said elements $y_{ik}$ with a third matrix C having elements $C_{li}$, said second stage comprising:

a second plurality of pipeline circuits which operate in parallel, each pipeline circuit of the second stage for sequentially outputting the products $c_{li} y_{ik}$ for a particular value k; and associated accumulator means, each accumulator means for selectively accumulating products $c_{li} y_{ik}$ for particular values of l from the associated pipeline circuit so that each accumulator means generates the sum $$z_{lk} = \sum_{i=1}^{I} c_{li} y_{jk},$$

wherein each pipeline circuit of the second stage, for multiplying the elements of a first sequence $c_{11}$, $c_{21}$, $\ldots$, $c_{L1}$, $c_{12}$, $c_{22}$, $\ldots$, $c_{L2}$, $\ldots$, $c_{L1}$ with the elements of second sequence comprising L repetitions of each element of the sequence: $y_{1k}$, $y_{2k}$, $\ldots$, $y_{Ik}$ for a particular value of k, comprises:

a first processing element simultaneously receiving two inputs per cycle comprising the first bit of each element of said first sequence and each element of said second sequence, said first processing element outputting the products of said two inputs thereto, one per cycle;

a plurality of processing elements labeled 2, $\ldots$, p, $\ldots$, p, where p is the number of bits of each element of said first sequence, the $p^{th}$ processing element receiving two inputs per cycle comprising the $p^{th}$ bit of each element of said first sequence and each element of said second sequence, said $p^{th}$ processing element outputting the sum of the product of said two inputs thereto and the sum of the $p-1^{th}$ processing element.

10. The circuit of claim 9 wherein each of said first processing elements comprises:

a register for storing each element of said second sequence;

a multiplexer receiving the first bit of said first sequence elements as a selector control input, and said second sequence elements as a data input, said multiplexer selecting said second sequence element if said bit equals a logic one and selecting a logic zero if said bit equals a logic zero; and an accumulation means for storing the output of said multiplexer.

11. The circuit of claim 9 wherein each of said processing elements, except for the first, comprises:

a register for storing said second sequence elements;

a multiplexer, the multiplexer of the $p^{th}$ processing element receiving the $p^{th}$ bit of said second sequence elements as a selector control input, and said second sequence elements from said register of the $p-1^{th}$ processor element as a data input, said multiplexer selecting the second sequence element if said bit equals a logic one and selecting a logic zero if said bit equals a logic zero; and an accumulation means for computing and storing the sum of the output of said multiplexer, shifted left $p-1$ bits, and the value stored in the accumulation means of the $p-1^{th}$ stage.

12. The circuit of claim 9 wherein said second stage further comprises a plurality of registers connected in tandem, said registers receiving said first sequence and outputting the $p^{th}$ bit of each element on consecutive cycles to the corresponding $p^{th}$ processing element of each processing pipeline.

13. The circuit of claim 12 wherein said accumulation means comprise carry-save adder circuits.

14. A method for multiplying three matrices comprising the steps of:

in a first multiplication circuit stage, multiplying a first matrix X having elements $x_{ij}$ $i=1 \ldots I$, $j=1 \ldots J$ with a second matrix A having elements $a_{jk}$, $k=1 \ldots K$ said multiplication step of said first stage comprising:

in a first plurality of pipeline circuits, sequentially generating, in each pipeline circuit simultaneously, the elements:

$$y_{ik} = \sum_{j=1}^{J} x_{ij} a_{jk}$$

of an intermediate product matrix $Y = X \cdot A$ for a particular value of k; and in a second multiplication circuit stage, receiving the elements $y_{ik}$ as said elements $y_{ik}$ are generated by the first stage and multiplying said elements $y_{ik}$ with a third matrix C having elements $c_{li}$, said multiplication step of said second stage comprising the steps of:

in a second plurality of pipeline circuits, sequentially generating the products $c_{li}y_{ik}$ for a particular value k from each pipeline circuit simultaneously; and in associated accumulator means, selectively accumulating said products $c_{li}y_{ik}$ for particular values of l from the associated pipeline circuit so that each accumulator means generates the elements $$z_{lk} = \sum_{i=1}^{I} c_{li}y_{ik}$$

of a product matrix $Z = C \cdot Y$.

15. A circuit for multiplying three matrices, C, having elements $C_{li}$, $i = 1 \ldots I$, $l = 1 \ldots L$, X having elements $x_{ij}$, $j = 1 \ldots J$, and A, having elements $a_{jk}$, $k = 1 \ldots K$, said circuit comprising:

a first stage having a first plurality of circuits, each capable of simultaneously multiplying each element $a_{jk}$ in a particular column k of A with a corresponding element $x_{ij}$ in a $j^{th}$ column of X and capable of simultaneously sequentially outputting the elements $$y_{ik} = \sum_{j=1}^{J} x_{ij}a_{jk}$$

of said particular $k^{th}$ column of an intermediate product matrix $Y = X \cdot A$, and a second stage having a second plurality of circuits, each capable of simultaneously receiving the elements $y_{ik}$ of a particular column k of Y as said elements $y_{ik}$ are outputted by a corresponding first circuit, capable of multiplying each element $c_{li}$ of C with a corresponding received element $y_{ik}$ in an $i^{th}$ row of said particular column k of Y and capable of outputting each product $c_{li}y_{ik}$ for a particular value k, and a plurality of associated accumulators, each capable of receiving said products $c_{li}y_{ik}$ of a particular column k of a corresponding second circuit and capable of selectively accumulating said products for particular values of l to generate the elements $$z_{lk} = \sum_{i=1}^{I} c_{li}y_{ik}$$

of a product matrix $Z = C \cdot Y$.

16. A process for multiplying three matrices, C, having elements $c_{li}$, $i = 1 \ldots I$, $l = 1 \ldots L$, X, having elements $x_{ij}$, $j = 1 \ldots J$, and A, having elements $a_{jk}$, $k = 1 \ldots k$, said process comprising the steps of:

simultaneously, in each of a first plurality of pipelined circuits of a first stage, sequentially multiplying each $a_{jk}$ in a particular column k of A with a corresponding element $k_{ij}$ in a $j^{th}$ column of X and simultaneously sequentially outputting the elements $$y_{ik} = \sum_{j=1}^{J} x_{ij}a_{jk}$$

of said particular $k^{th}$ column of an intermediate product matrix $Y = X \cdot A$, simultaneously, in each of a second plurality of pipelined circuits of a second stage, receiving the elements $y_{ik}$ of a particular column k of Y as said elements $y_{ik}$ are outputted by a corresponding first pipelined circuit, multiplying each element $c_{li}$ of C with a corresponding received element $y_{ik}$ in an $i^{th}$ row of said particular column k of Y and outputting each product $c_{li}y_{ik}$ for said particular value k, and in each accumulator associated with a second pipelined circuit of said second stage, simultaneously receiving each product $c_{li}y_{ik}$ for a particular value k and selectively accumulating products for particular values of l to generate the elements $$z_{lk} = \sum_{i=1}^{I} c_{li}y_{ik}$$

of a product matrix $Z = C \cdot Y$.

* * * * *

UNITED STATES PATENT AND TRADEMARK OFFICE
CERTIFICATE OF CORRECTION

PATENT NO. : 5,204,830
DATED : April 20, 1993
INVENTOR(S) : Jinn-Shyan Wang and Jinn-Nan Kao It is certified that error appears in the above-indentified patent and that said Letters Patent is hereby corrected as shown below:

On the title page, Item [75], change "Jinn-Shyan Wang, Hsin-Chu;
Jinn-Nan Kao, Taipei,"

to read —Jinn-Nan Kao, Taipei;
Jinn-Shyan Wang, Hsin-Chu,—

Signed and Sealed this

Second Day of May, 1995

*Attest:*

BRUCE LEHMAN

*Attesting Officer*     Commissioner of Patents and Trademarks